US012393356B2

(12) United States Patent
Thompson et al.

(10) Patent No.: US 12,393,356 B2
(45) Date of Patent: Aug. 19, 2025

(54) OBJECT COPY DRIVER MODULE FOR OBJECT MIGRATION

(71) Applicant: NetApp Inc., San Jose, CA (US)

(72) Inventors: Cheryl Marie Thompson, Sunnyvale, CA (US); Garima Choudhary, San Jose, CA (US); Rajesh Sudarsan, San Jose, CA (US)

(73) Assignee: NetApp, Inc., San Jose, CA (US)

( * ) Notice: Subject to any disclaimer, the term of this patent is extended or adjusted under 35 U.S.C. 154(b) by 35 days.

(21) Appl. No.: 18/423,864

(22) Filed: Jan. 26, 2024

(65) Prior Publication Data
US 2025/0244887 A1 Jul. 31, 2025

(51) Int. Cl.
*G06F 3/06* (2006.01)
(52) U.S. Cl.
CPC .......... *G06F 3/0625* (2013.01); *G06F 3/0647* (2013.01); *G06F 3/0673* (2013.01)
(58) Field of Classification Search
CPC ...... G06F 2/0647; G06F 2/067; G06F 2/0683; G06F 2/061; G06F 2/065; G06F 2/0673; G06F 2/0635; G06F 2009/4557; G06F 16/119; G06F 9/5088; G06F 16/182
See application file for complete search history.

(56) References Cited

U.S. PATENT DOCUMENTS

| | | | |
|---|---|---|---|
| 9,229,656 B1 | 1/2016 | Contreras et al. | |
| 10,360,099 B2 | 7/2019 | Subramanian et al. | |
| 10,521,143 B2 | 12/2019 | Subramanian et al. | |
| 11,036,420 B2 | 6/2021 | Thoppil et al. | |
| 11,048,430 B2 | 6/2021 | Thoppil et al. | |
| 11,132,339 B2 | 9/2021 | Kaushik et al. | |
| 11,151,162 B2 | 10/2021 | Narasingarayanapeta et al. | |
| 11,210,013 B2 | 12/2021 | Thoppil et al. | |
| 11,615,001 B2 | 3/2023 | Naidu et al. | |
| 11,650,886 B2 | 5/2023 | Mathew et al. | |
| 11,853,104 B2 | 12/2023 | Naidu et al. | |
| 2021/0072917 A1* | 3/2021 | Surla .................... | G06F 3/0614 |
| 2023/0115261 A1* | 4/2023 | Xiao ................... | G06F 9/45558 718/104 |

(Continued)

OTHER PUBLICATIONS

Notice of Allowance mailed on Mar. 19, 2025 for U.S. Appl. No. 18/423,873, filed Jan. 26, 2024, 08 pages.

(Continued)

*Primary Examiner* — Hiep T Nguyen
(74) *Attorney, Agent, or Firm* — Cooper Legal Group, LLC

(57) ABSTRACT

Techniques are provided for migrating a volume utilizing an object copy work queue and an object copy driver module. Data of the volume is stored within objects stored across a storage tier and capacity tier of a source object store. As part of migrating the volume to a destination object store, the objects are migrated to the destination cluster. Directly copying the objects involves multiple read operations to the source object store and a write operation at the destination object store. The techniques provided herein improve the efficiency of the migration by initially sending metadata from the source object store to the destination object store for performing backend object copy operations to migrate the volume. This results in fewer operations and less network usage, thus improving the efficiency and cost of migrating the volume.

20 Claims, 13 Drawing Sheets

(56) References Cited

U.S. PATENT DOCUMENTS

2023/0229579 A1* 7/2023 Rayev ................ G06F 16/182
 702/186
2024/0134822 A1* 4/2024 Shaw ................ G06F 16/1824

OTHER PUBLICATIONS

"FabricPool tier management", NetApp, URL: https://docs.netapp.com/us-en/ontap/pdfs/sidebar/FabricPool_tier_management.pdf, Apr. 16, 2024, 58 pages.

"HA pair management", NetApp, URL: https://docs.netapp.com/us-en/ontap/pdfs/sidebar/HA_pair_management.pdf, Apr. 16, 2024, 26 pages.

"SVM data mobility", NetApp, URL: https://docs.netapp.com/us-en/ontap/pdfs/sidebar/SVM_data_mobility.pdf, Apr. 16, 2024, 14 pages.

* cited by examiner

OBJECT COPY DRIVER MODULE FOR OBJECT MIGRATION

BACKGROUND

A virtual server such as a storage virtual machine is hosted by a cluster of one or more nodes. The virtual server provides storage services to clients, such as data storage, replication, deduplication, compression, encryption, backup and restore function, tiering functionality, and/or other storage services. For example, the virtual server stores data of a volume in one or more objects within an object store. The data can be stored within a storage tier of the object store. The virtual server is able to directly read and write to the blocks stored within the storage tier of the object store. Some of the data can be tiered out from the storage tier to a capacity tier of the object store. The capacity tier provides lower cost, long term storage compared to the storage tier. However, access to the objects within the capacity tier is slower than access to the data within the storage tier. In this way, the objects, storing data of the volume, can be tiered amongst the storage tier and the capacity tier in a storage efficient manner such as where frequently accessed data are stored in the storage tier for fast access and infrequently accessed objects are stored (archived) in the capacity tier for lower cost, longer term storage.

DETAILED DESCRIPTION

Figure 1:
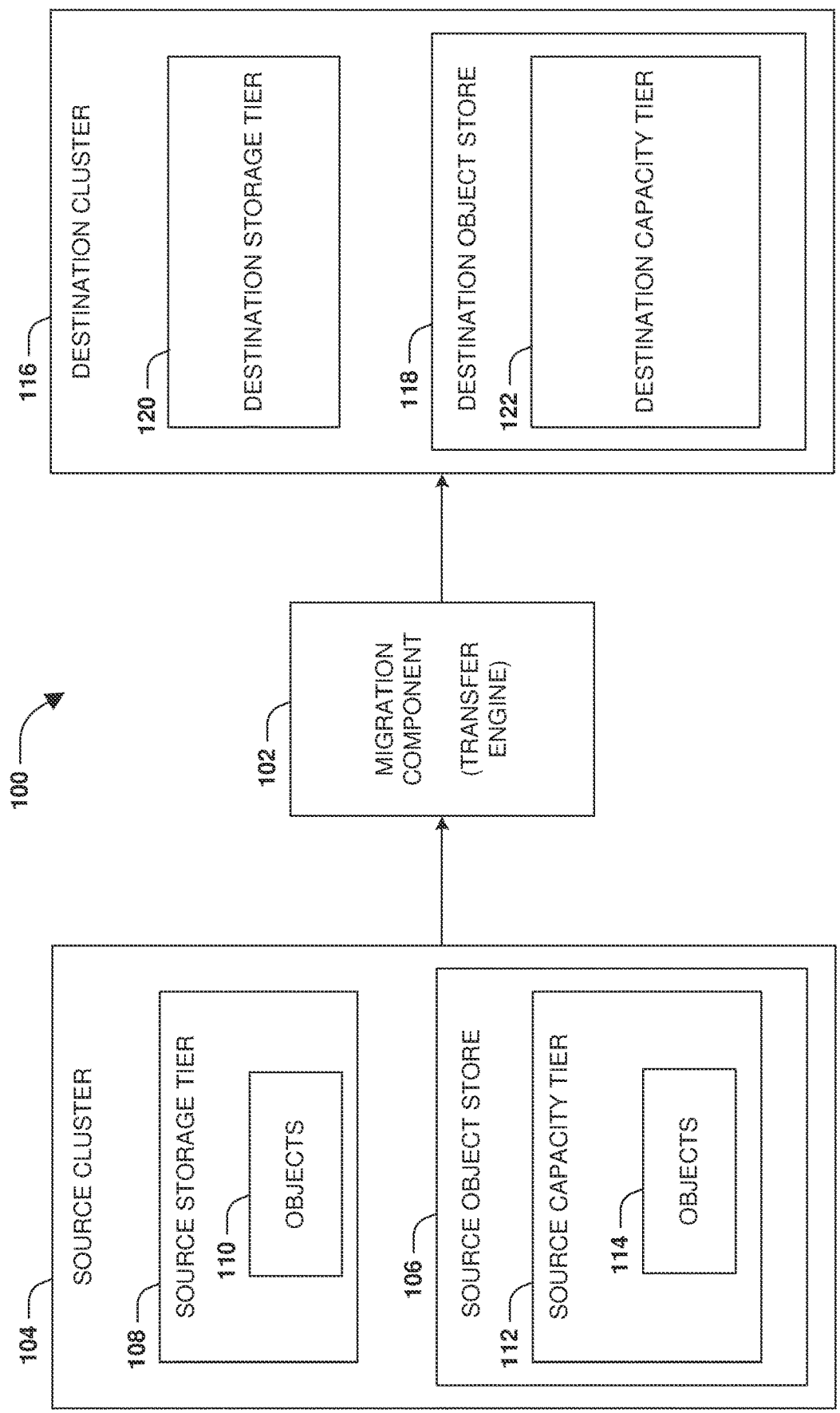
FIG. 1 is a block diagram illustrating an example of migrating a volume from a source cluster to a destination cluster utilizing backend object copy operations in accordance with an embodiment of the present technology.

Some examples of the claimed subject matter are now described with reference to the drawings, where like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. Nothing in this detailed description is admitted as prior art.

Systems and method are provided for an object copy driver module and object copy work queue utilized by a destination cluster to copy objects from a source object store to a destination object store. In particular, the copy driver module process pending copy work entries within the object copy work queue in order to migrate objects of a volume from the source cluster to the destination cluster in an efficient manner that reduces network usage and consumes less read and write operations than other volume migration techniques. Data of the volume is stored across a source storage tier (e.g., blocks of data stored within a performance tier such as within solid state drives or other storage media) and a source capacity tier of a source object store hosted by the source cluster (e.g., objects storing blocks of data tiered from the source storage tier to the source capacity tier of the source object store). The data within the source storage tier (e.g., blocks of data) can be directly accessed such as by a storage virtual machine, while the objects within the source capacity tier (e.g., blocks of data tiered from the performance tier to the source object store as the objects) are read into memory. When the volume is migrated to a destination object store of the destination cluster, the objects within the source capacity tier will be migrated to a destination capacity tier and the data within the source storage tier will be migrated to a destination storage tier.

Conventional volume migration techniques perform a data transfer phase where the actual data of the objects is transferred from the source cluster to the destination cluster. If a block of an object is located within the source capacity tier, then the block must be read into memory before the block can then be migrated from the source storage tier to the destination object store. This part of the data transfer phase requires multiple read operations (GET operations) at the source cluster, which is costly and consumes bandwidth. In addition to the multiple read operations at the source cluster, there is a write operation (PUT operation) at the destination cluster to store the block. The multiple read operations followed by the write operation for each object located at the source capacity tier makes the volume migration operation expensive and inefficient.

Accordingly, as provided herein, a cost-optimized volume migration technique is performed by the object copy driver module to migrate the volume using backend copy operations of the object store, which avoids the costly reads and write operations performed by conventional volume migration techniques. In this way, the volume is migrated using fewer operations and less network utilization. As part of the volume migration, a metadata transfer path is provided to transfer metadata about the blocks stored in the source capacity tier to the destination cluster. The metadata is transferred instead of the actual data, which avoids the costly read and write operations performed by the conventional data transfer phase. Instead, the metadata is used to populate an object copy work queue with copy work entries of objects to copy from the source cluster to the destination cluster. An object copy driver module is configured to process the object copy work queue in order to perform the backend copy operations to complete the migration of the volume. In this way, the cost-optimized volume migration is capable of migrating the volume from the source cluster to the destination cluster while avoiding the costly read and write operations otherwise performed by the data transfer phase of conventional volume migration techniques.

FIG. 1 is a block diagram illustrating an example of a system 100 for migrating a volume from a source cluster 104 to a destination cluster 116 utilizing backend object copy operations. The source cluster 104 comprises one or more nodes (e.g., a server, a compute instance, a container, cloud resources, or any other computing device). The nodes of the source cluster 104 host a source object store 106. Clients, such as a storage virtual machine, virtual server, an application, a host, or other type of client, store data into a source storage tier 108 (e.g., a performance tier storing data as blocks, which are also referred to as objects or any other unit of storage), which may be tiered out as objects that are stored within the source object store 106. In some embodiments, data, of a volume used by a virtual server or virtual storage machine, is stored within the objects. The objects 110 (e.g., blocks of a solid state drive of a performance tier) are stored within a source storage tier 108 that is directly accessible to the client. The source object store also provides a source capacity tier 112 (e.g., an archival storage tier) into which objects 114 can be stored (e.g., objects 114 comprising data tiered out from blocks of the source storage tier 108). The source capacity tier 112 may be slower but lower cost than the source storage tier 108. Thus, infrequently accessed data may be tiered from the source storage tier 108 to the source capacity tier 112 in order to reduce storage costs using lower cost long term archival storage. In this way, data of the volume can be stored within objects that are stored across the source storage tier 108 as objects 110 and across the source capacity tier 112 as objects 114.

A migration component 102 may be hosted at the source cluster 104, at the destination cluster 116, on a device remote to the source cluster 104 and the destination cluster 116, or is distributed across one or more of the source cluster 104, the destination cluster 116, and/or the remote device. The migration component 102 may include a transfer engine, an object copy work queue, an object copy driver module, a read path, and/or other functionality configured to migrate data from the source cluster 104 to the destination cluster 116 in order to migrate the volume. The migration component 102 receives a migration request for the volume or determines that the volume and/or a virtual server or storage virtual machine storing data within the volume is to be migrated from the source cluster 104 to the destination cluster 116.

In response to determining that the volume is to be migrated, the objects 114 stored within the source capacity tier 112 are identified (e.g., blocks within a performance tier storing data of the volume). Conventional transfer of the objects 114 would require multiple read operations to read and transfer the objects 114 from the source capacity tier 112, and then write operations to write the objects 114 to the destination object store 118. Instead of performing a conventional data transfer phase for the objects 114, metadata of blocks of the objects 114 is identified and provided to the transfer engine of the migration component 102. The transfer engine encodes the metadata to create encoded metadata to indicate that the objects 114 are stored within the source capacity tier 112. The transfer engine sends the encoded metadata to the destination cluster 116 for performing backend object copy operations to store copies of the objects 114 into a destination capacity tier 122. As part of the migration, the objects 110 within the source storage tier 108 (e.g., the blocks of data within the performance tier) are also migrated to the destination storage tier 120 to complete the migration of the volume.

An object copy work queue may be maintained at the destination cluster 116. The object copy work queue is populated with pending copy work entries created using the encoded metadata received by the destination cluster 116 from the transfer engine of the migration component 102. The pending copy work entries comprise object identifiers of objects to copy/migrate from the source object store 106 to the destination object store 118 by the object copy driver module. In this way, the object copy driver module processes the pending copy work entries to copy the objects into the destination object store 118 for migrating the volume. In particular, the object copy driver module dispatches batches of worker messages to issue backend copy operations for batches of object identifiers within pending copy work entries. Persistent checkpoints are created for the batches of object identifiers to track inflight backed copy operations pending for completion. A persistent checkpoint is used to identify a next object to copy to the destination object store 118. The object copy driver module uses the object copy work queue to ensure that all blocks of objects being migrated to the destination object store 118 are copied into valid objects.

The read path is used to direct read operations to the source object store 106 if the read operations target copy pending objects still stored in the source object store 106 (e.g., objects pending for migration to the destination object store 118). The read path is used to redirect read operations to the destination object store 118 if the read operations target migrated objects already migrated to the destination object store 118. For a read operation directed to the destination object store 118, a reverse map is used to verify context information and validate data being read from a migrated object. The read path utilizes the context information instead of a virtual volume block number, thereby avoids a mismatch error. The virtual volume block number mismatch error may otherwise result from a source based virtual volume block number stored in a context area of the copied object not matching a virtual volume block number expected at the destination cluster 116. In this way, users can access data of the volume during and after the migration.

Figure 2:
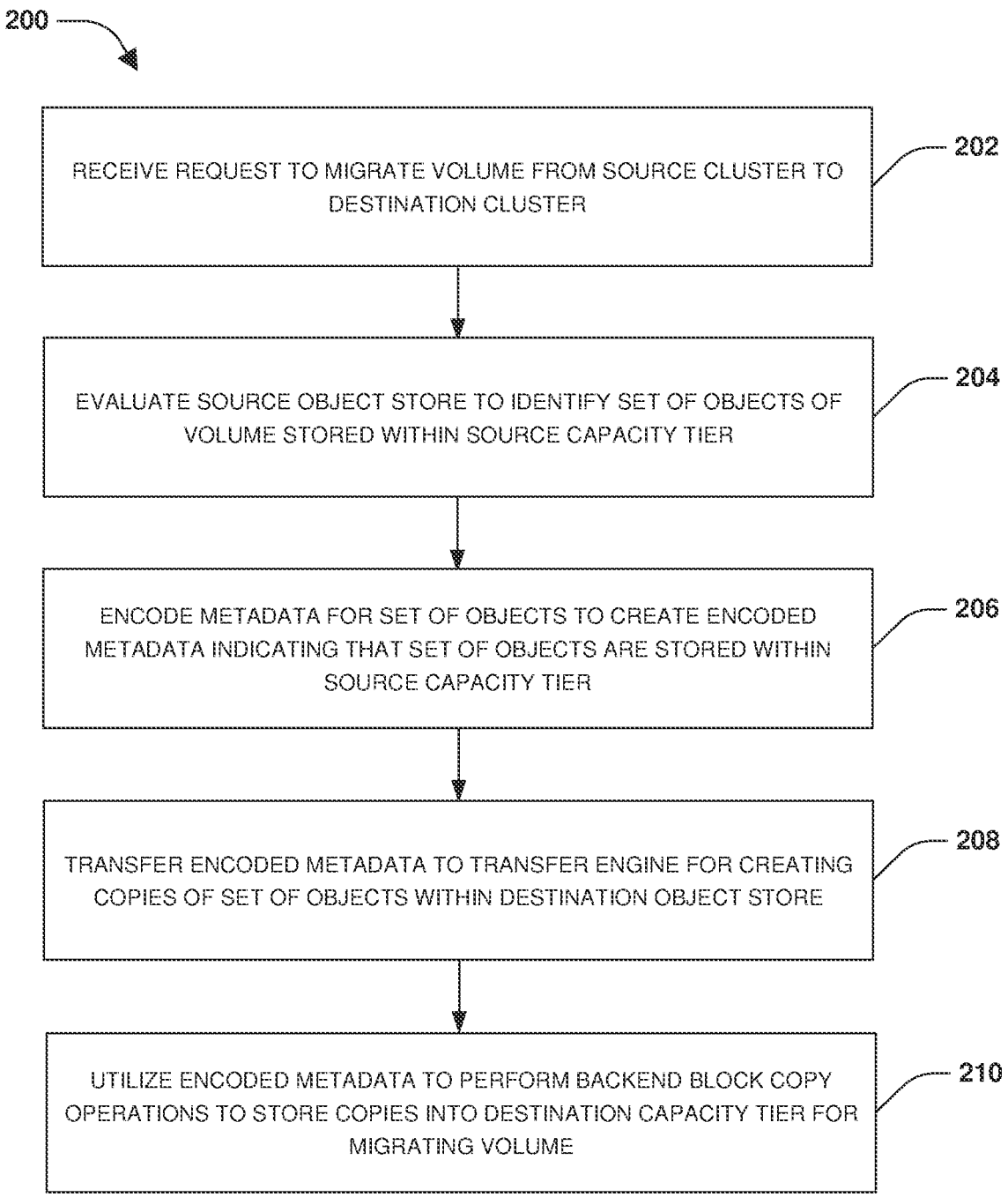
FIG. 2 is a flow chart illustrating an example method for migrating a volume from a source cluster to a destination cluster utilizing backend object copy operations in accordance with an embodiment of the present technology.
Figure 3:
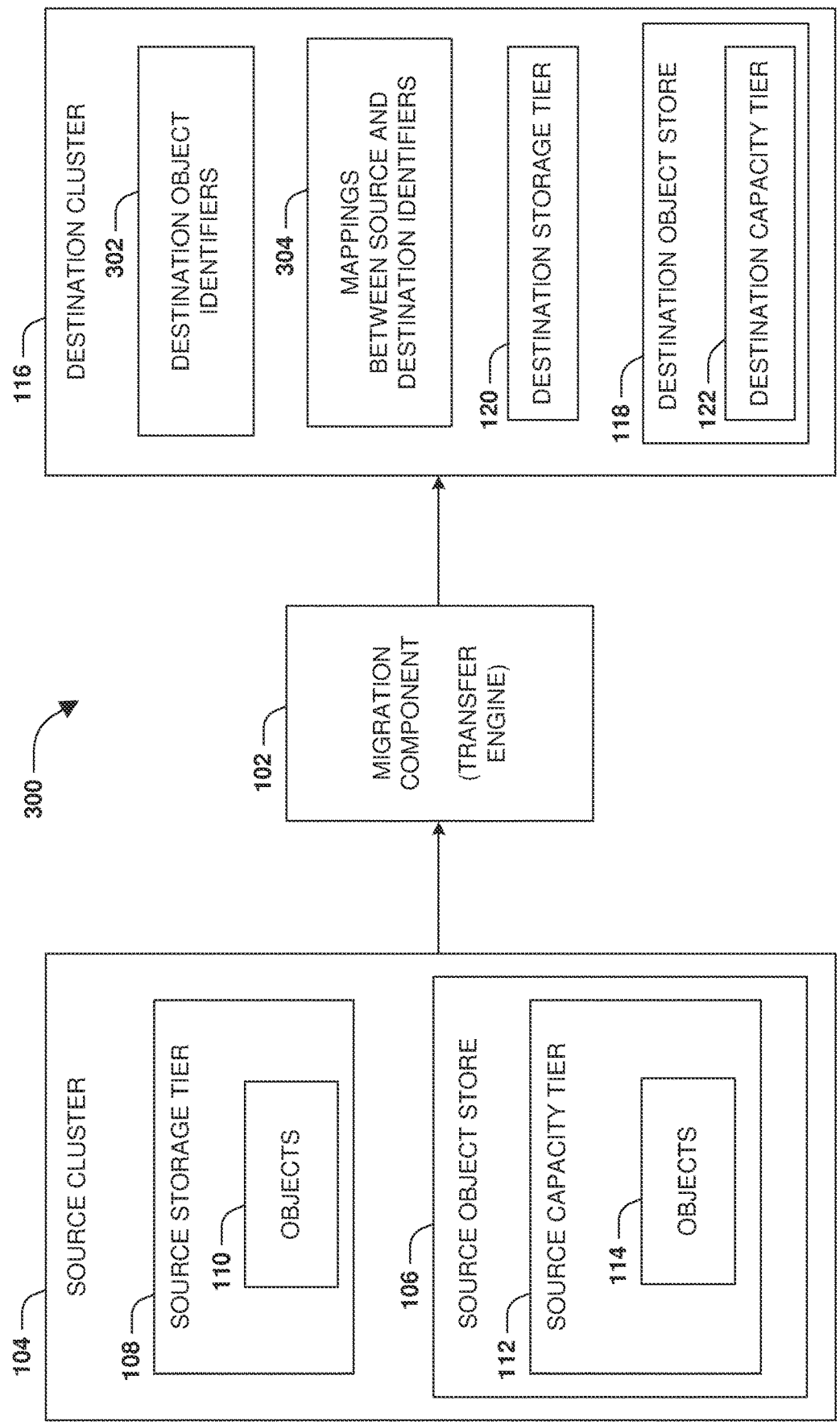
FIG. 3 is a block diagram illustrating an example of migrating a volume from a source cluster to a destination cluster utilizing backend object copy operations in accordance with an embodiment of the present technology.

FIG. 2 is a flow chart illustrating an example method 200 for migrating a volume from the source cluster 104 to the destination cluster 116 utilizing backend object copy operations, which is illustrated in conjunction with system 300 of FIG. 3. During operation 202 of method 200, the migration component 102 receives a request to migrate the volume from the source cluster 104 to the destination cluster 116. Data of the volume is stored as the objects 110 within the source storage tier 108 (e.g., blocks of data stored within a performance tier) and as the objects 114 within the source capacity tier 112 of the source object store 106.

During operation 204 of method 200, the migration component 102 identifies the objects 114 of the volume that are stored within the source capacity tier 112. Conventional data transfer phase techniques would have to perform a first read operation for a block of one of the objects 114 to read the block from the source capacity tier 112, and a write operation to write the block to the destination cluster 116, which is expensive and consumes network bandwidth. Instead of sending the actual data during the data transfer phase from the source cluster 104 to the destination cluster 116, metadata is encoded and sent to the destination cluster 116 for performing backend object copy operations for migrating the volume.

During operation 206 of method 200, the transfer engine of the migration component 102 encodes metadata for the objects 114 within the source capacity tier 112. The metadata is encoded within information (e.g., a flag, an indicator, location information, etc.) to indicate that the objects 114 currently reside within the source capacity tier 112 of the source object store 106.

During operation 208 of method 200, the encoded metadata is transferred by the transfer engine of the migration component 102 to the destination cluster 116 for creating migrated copies, of the objects 114, into the destination capacity tier 122 of the destination object store 118 hosted by the destination cluster 116. During operation 210 of method 200, the encoded metadata is utilized to perform backend object copy operations to store copies of the objects 114 into the destination capacity tier 122 for migrating the volume. It may be appreciated that operations performed to copy the objects 114 will be described in further detail in relation to FIGS. 6 and 7.

As part of the migration of the volume, a block storing data of one of the objects 114 is encountered. If the block is encountered for the first time (e.g., an identifier of the block is not yet included within mappings between source and destination identifiers 304), then a new destination object identifier is assigned at the destination cluster 116 for the block (e.g., for a migrated object that is to store the block). In this way, the destination cluster 116 tracks destination object identifiers 302 of newly encountered blocks (e.g., migrated objects to store the newly encountered blocks).

In some embodiments, a mapping is created within the mappings between source and destination identifiers 304 based upon encountering the block for the first time (e.g., the first time encountering a block that is part of the object). The mapping is created to map a source object identifier used by the source cluster 104 to reference the object at the source object store 106 and a new destination object identifier assigned for the object at the destination cluster 116 (e.g., an identifier of a migrated object that will be stored within the destination capacity tier 122 as a migrated copy of the object from the source object store 106). In some embodiments, a copy of the block is stored into the destination capacity tier 122 (e.g., by a backend object copy operation) based upon the mapping between the source object identifier used by the source cluster 104 to reference the object and the new destination object identifier assigned for the object at the destination cluster 116.

In some embodiments, a block from the objects 114 is evaluated to determine whether the block belongs to an object identified as a valid object (e.g., blocks of data to tier out to the source capacity tier 112 are assembled into an object that is not valid until the object has been successfully tiered into the source capacity tier 112 to and/or verified). If the block belongs to a valid object, then object metadata and block information is read for the block. In response to determining that the object metadata and the block information comprises an entry for the object identified as the valid object, then a reference count specified by the entry is incremented. In response to determining that the object metadata and the block information does not comprise an entry for the object identified as the valid object, a new object identifier for the object, located at the destination object store 118, is added into an object mapping file.

In response to determining that the block does not belong to a valid object (e.g., the object has not yet been stored into the source capacity tier 112 and/or has not been verified), data is read from the block and is transferred from the source storage tier 108 to the destination object store 118 by the transfer engine. In some embodiments, a placement indicator is generated to specify where the block resides in response to determining that the block does not belong to a valid object. The placement indicator and the data of the block is read and transferred from the source cluster 104 to the destination object store 118. The placement indictor is used to write the data of the block to a new object at the destination capacity tier 122.

In some embodiments, a consistency point is performed to persist objects to persistent storage of the destination cluster 116 where the destination object store 118 is either physical separate from the destination cluster 116 (e.g., but logically part of the destination cluster 116) or is part of the destination cluster 116. In response to determining that an object to persist has not been allocated a new object identifier, a reference count of an existing object identifier of the object is incremented. A reference count of an object is used to track how many blocks of the object have been transferred from the source cluster 104 to the destination cluster 116 (e.g., an object with a reference count of 6 indicates that 6 blocks of the object have been transferred and are being used). In response to determining that an object to persist has been allocated a new object identifier, a state for the object is transitioned to a pending copy state. Additionally, a reverse map entry with context information for the object is created. The new object identifier is added to an object copy work queue (e.g., an object copy work queue metafile) that is processed to perform backend object copy operations for migrating the objects to the destination object store 118 to complete the migration of the volume.

In some embodiments of the techniques described herein, an object mapping file is utilized as part of identifying, encoding, and transmitting metadata from the source cluster 104 to the destination cluster 116. During a logical replication data transfer phase on the source cluster 104, when a tiered block that needs to be transferred from the source capacity tier 112 to the destination is encountered while walking through container file regions of a volume, local filesystem metadata of the object to which this block belongs is sent to the destination cluster 116 instead of reading the actual data from a source object store bucket. The transfer engine is configured to differentiate this metadata from actual data. The transfer engine will set a special encoding flag on this block, which the destination cluster 116 understands before chains of such blocks are sent to the destination object store 118.

At the destination cluster 116, when a logical engine is processing these blocks, a check is performed to determine if the logical engine has already seen a different (previous) block from this object, and thus has already noted that the object is to be copied to the destination object store 118 based upon encountering the previous block (e.g., when the previous block was encountered, the object was marked as a copy pending object to copy from the source object store 106 to the destination object store 118). This is where an object mapping file is used. The object mapping file is used to note which objects need to be copied from the source object store bucket (the source object store 106) to a destination object store bucket (the destination object store 118). If this is the first time a block of the object at the source object store 106 is encountered, then a new object identifier is assigned at the destination cluster 116 and a mapping of a source object identifier to a destination object identifier (the new object identifier) is tracked in this object mapping file. For all subsequent blocks of the same object, the destination will find the existing mapping in the object mapping file and can determine that the object has already been designated for copying/migration from the source object store 106 to the destination object store 118.

Figure 4:
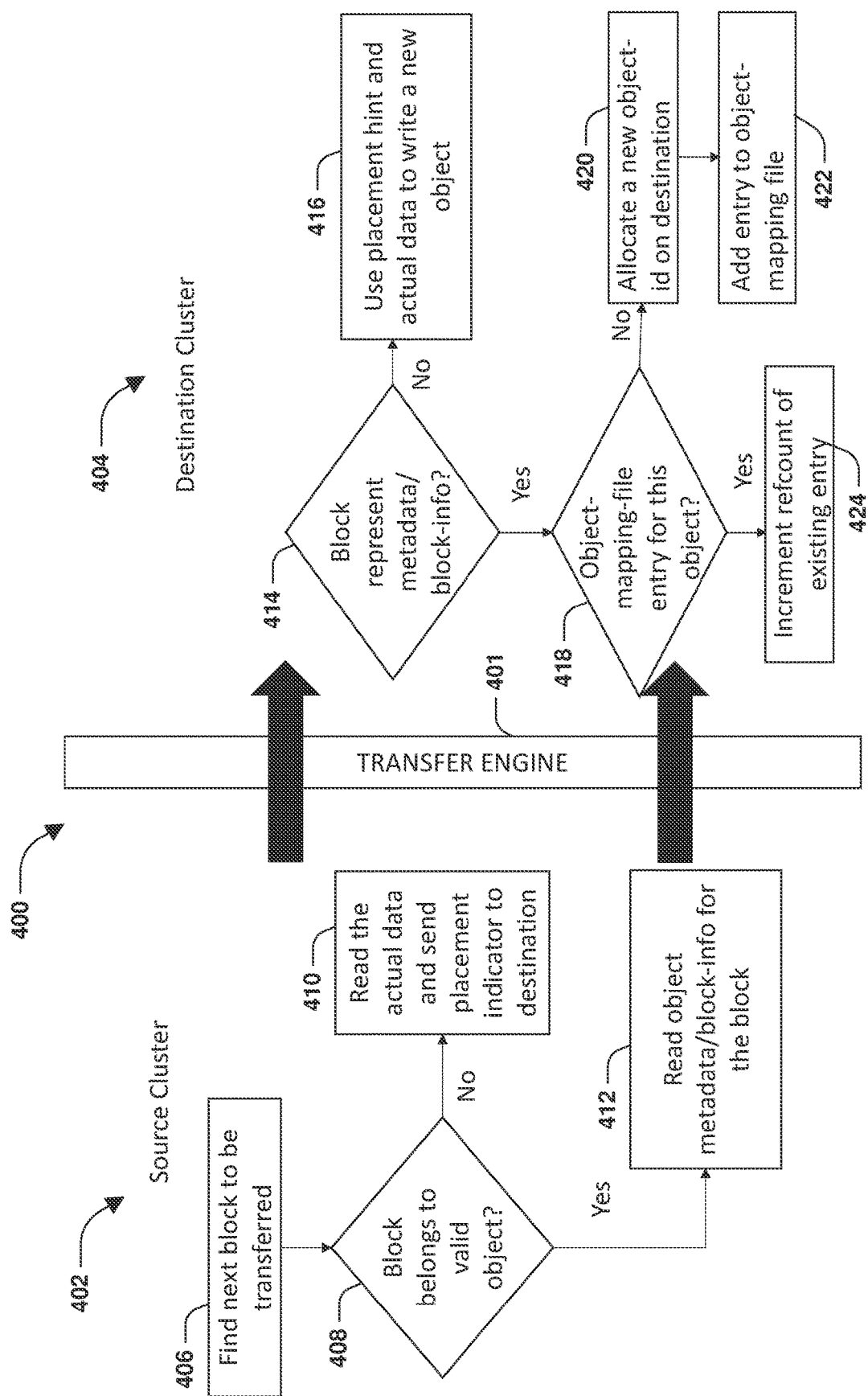
FIG. 4 is a flow chart illustrating an example method of a transfer engine migrating a volume from a source cluster to a destination cluster in accordance with an embodiment of the present technology.

FIG. 4 is a flow chart illustrating an example method 400 of a transfer engine 401 migrating a volume from a source cluster 402 to a destination cluster 404. During operation 406 of method 400, the source cluster 402 identifies a next block of the volume to transfer from the source cluster 402 to the destination cluster 404. During operation 408 of method 400, a determination is made as to whether the block belongs to a valid object. If the block does not belong to a valid object, then the actual data of the block is read and is transmitted along with a placement indicator through the transfer engine 401 to the destination cluster 404, during operation 410 of method 400. If the block belongs to a valid object, then object metadata and block information is read for the block, during operation 412 of method 400.

If the block did not belong to a valid object, then the destination cluster 404 determines whether the block is represented by metadata and block information maintained by the destination cluster 404, during operation 414 of method 400. If the block is not represented by the metadata and the block information maintained by the destination cluster 404, then a placement hint is used to write the actual data of the block to a new object, during operation 416 of method 400.

If the block did belong to a valid object or the block is represented by the metadata and the block information maintained by the destination cluster 404, then a determination is made as to whether there is an entry (e.g., an object mapping file entry) for the object, during operation 418 of method 400. If there is an existing entry for the object, then a reference count for the existing mapping entry (e.g., a mapping entry within an object mapping file_is incremented, during operation 424 of method 400. If there is no existing entry for the object, then a new object identifier is allocated at the destination cluster 404, during operation 420 of method 400. During operation 422 of method 400, an entry is added to an object mapping file using the new object identifier. In this way, information about block is transferred as part of migrating the volume from the source cluster 402 to the destination cluster 404 so that metadata about the object set up at the destination cluster is available for triggering the copying of the data into the object and for management of the object.

Figure 5:
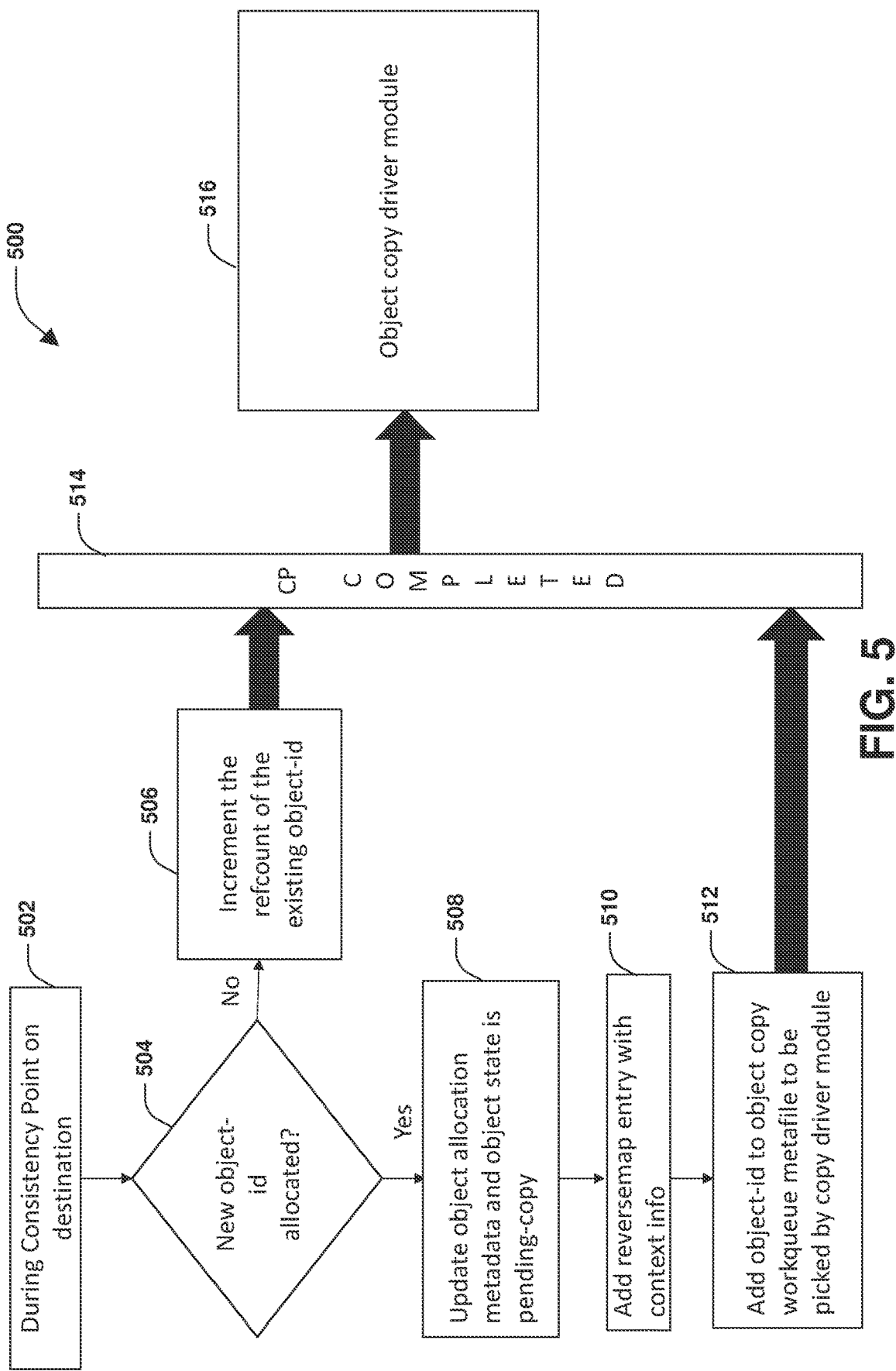
FIG. 5 is a flow chart illustrating an example method of a consistency point operation performed as part of a migration of a volume from a source cluster to a destination cluster in accordance with an embodiment of the present technology.

FIG. 5 is a flow chart illustrating an example method 500 of a consistency point operation performed as part of a migration of a volume from a source cluster to a destination cluster. During operation 502 of method 500, the consistency point operation is performed. During operation 504 of method 500, a determination is made as to whether the consistency point operation is allocating a new object identifier for a block of the volume being migrated to the destination cluster. If a new object identifier is not being allocated, then a reference count on an existing object identifier is incremented, during operation 506.

If a new object identifier is being allocated, then the object allocation metadata is updated based upon the new object identifier and an object state is transitioned to a pending copy state, during operation 508 of method 500. During operation 510 of method 500, an entry is added to a reverse map with context information for the new object identifier of the object pending to be copied/migrated. During operation 512 of method 500, the new object identifier is added to an object copy work queue (metafile) for processing by an object copy driver module 516 after completion of the consistency point operation. During operation 514 of method 500, the consistency point operation is complete and the object copy driver module 516 is utilized for completing the migration of the volume.

Figure 6:
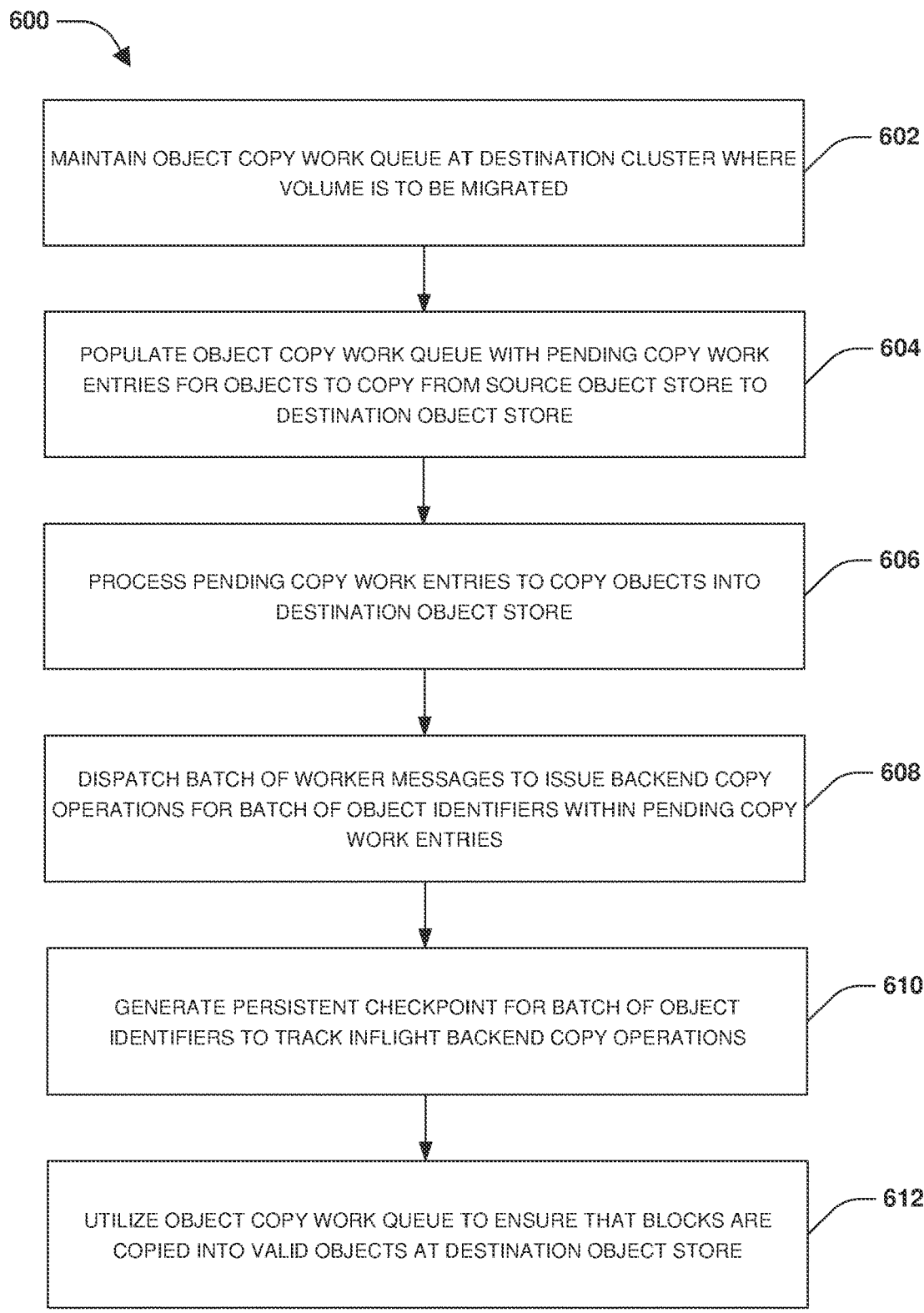
FIG. 6 is a flow chart illustrating an example method for migrating a volume from a source cluster to a destination cluster utilizing an object copy work queue in accordance with an embodiment of the present technology.
Figure 7:
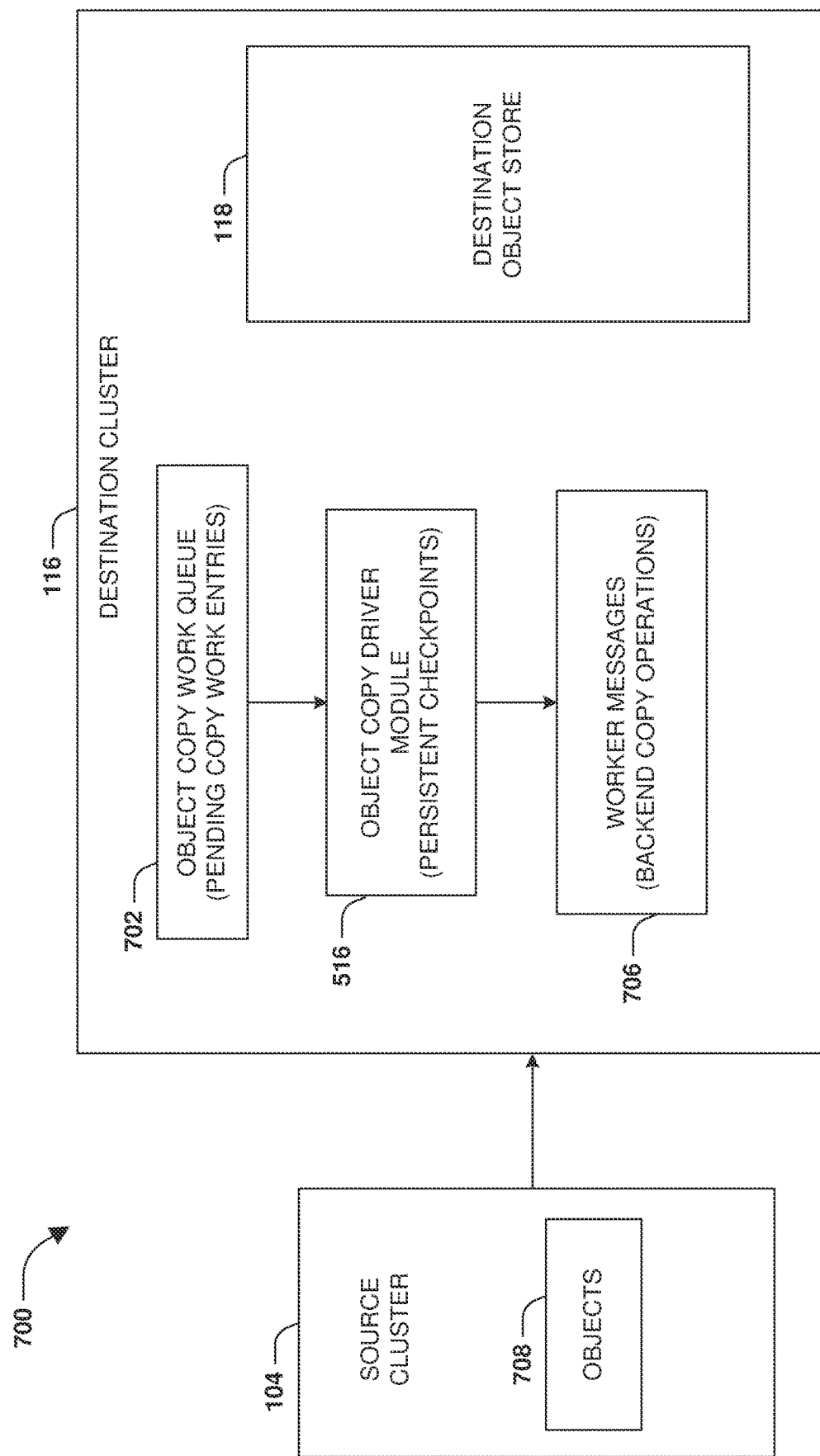
FIG. 7 is a block diagram illustrating an example of migrating a volume from a source cluster to a destination cluster utilizing an object copy work queue and an object copy driver module in accordance with an embodiment of the present technology.

FIG. 6 is a flow chart illustrating an example method 600 for migrating a volume from a source cluster 104 to a destination cluster 116 utilizing an object copy work queue 702, which is described in conjunction with system 700 of FIG. 7. In some embodiments, the method 600 may be performed, such as by the system 700, in conjunction with the operations described in relation to FIGS. 1-5. In some embodiments, the volume stores data within objects 708 of the source cluster 104. The objects 708 may be stored within the source storage tier 108 (e.g., blocks of data stored within a performance tier) and/or the source capacity tier 112 of the source object store 106.

During operation 602 of method 600, the object copy work queue 702 is maintained at the destination cluster 116 to track objects (e.g., blocks storing data of the volume stored within the objects 708) to migrate from the source object store 106 to the destination object store 118 as part of migrating the volume. The object copy work queue 702 may be maintained at the destination cluster 116 as part of migrating the volume.

During operation 604 of method 600, the object copy work queue 702 is populated with pending copy work entries. The pending copy work entries are generated from metadata received from the source cluster 104 such as through the transfer engine of the migration component 102. In some embodiments, the method 500 is performed to add new object identifiers into the object copy work queue 702 during performance of a consistency point operation, and the object copy work queue 702 is provided to the object copy driver module 516. In this way, the object copy work queue 702 is populated with pending copy work entries comprising object identifiers of objects (new object identifiers being allocated by the consistency point operation) to copy from the source object store 106 to the destination object store 118 of the destination cluster 116 by the object copy driver module 516.

During operation 606 of method 600, the object copy driver module 516 processes the pending copy work entries within the object copy work queue 702 to copy the objects 708 from the source object store 106 to the destination object store 118 for migrating the volume. The object copy driver module 516 processes batches of object identifiers specified by the pending copy work entries within the object copy work queue 702. For a batch of object identifiers within pending copy work entries, the object copy driver module 516 dispatches a batch of worker messages 706, during operation 608 of method 600. The batch of worker messages 706 are configured to issue backend copy operations for the batch of object identifiers for storing a set of objects, assigned the object identifiers of the batch of object identifiers, into the destination object store 118. In some embodiments, the backend copy operations are executed as backend object copy operations. In some embodiments, the backend copy operations (backend object copy operations) are performed by an object store (e.g., the source object store 106 or the destination object store 118), which is more efficient than externally (external to the object store) performing a conventional data transfer phase that includes multiple read operations and a write operation to migrate a single object from the source cluster 104 to the destination cluster 116.

As part of the worker messages 706 issuing the backend copy operations to an object store for execution, persistent checkpoints are created by the object copy driver module 516, during operation 610 of method 600. A persistent checkpoint is used to track inflight backend copy operations pending for completion. In some embodiments, the persistent checkpoint is populated with an object identifier of an object pending to be copied by an inflight backend copy operation. Once the object store indicates that the inflight backend copy operation is successful, the object identifier is removed from the persistent checkpoint, or the persistent checkpoint is cleared and a next object identifier of a next object pending to be copied by a next inflight backend copy operation is now specified within the persistent checkpoint.

In some embodiments, the persistent checkpoint is utilized to identify a next object to copy/migrate from the source object store 106 to the destination object store 118. For example, the batch of object identifiers of objects pending to be copied/migrated by inflight backend copy operations from the source object store 106 to the destination object store 118 may be inserted into the persistent checkpoint. As the objects are successfully copied, the corresponding object identifiers are removed from the persistent checkpoint. Thus, the persistent checkpoint can be evaluated to identify a next object to copy after a current object has been copied by an inflight backend copy operation. If there is a failure to copy one or more objects (e.g., or the migration is paused and then resumed), then the persistent checkpoint can be evaluated to identify the next object to copy for resuming the migration of the volume from where the process left off before the failure so that already copied objects are not copied again. In this way, the migration of the volume can be paused, resumed, restarted after a failure from where progress of the migration left off, transferred between different migration components or nodes, etc. using the persistent checkpoints.

In some embodiments, the object copy driver module 516 utilizes the object copy work queue 702 to ensure that all blocks of the objects 708 are copied from the source object store 106 into valid objects at the destination object store 118, during operation 612 of method 600. That is, the object copy work queue 702 is used to store the object identifiers of objects to migrate (e.g., objects of blocks storing data of the volume to migrate). The object identifiers are stored within pending copy work entries. Accordingly, the pending copy work entries are evaluated to identify the object identifiers that are matched with object identifiers of migrated objects stored into the destination object store 118 to validate that the migrated objects were indeed created as valid objects that mirror the objects 708 from the source cluster 104. In this way, migration of the volume can be track and verified using the object copy work queue 702.

In some embodiments of the object copy driver module 516, an operation may be received. If the operation relates to an abort or stop copy request, then the object copy driver module 516 stops sending new copy requests (e.g., stops dispatching worker messages) for copying objects from the source object store 106 to the destination object store 118. The object copy driver module 516 waits for inflight copy requests (e.g., inflight backend copy operations) to complete and ignores any copy errors. If the operation was an abort operation, then the object copy work queue 702 is emptied by punching out (removing) remaining pending copy work entries. If the operation was not an abort operation but a stop/pause operation, then a checkpoint is reset to a last completed batch of object identifiers. The object copy work queue 702 stops the copy operation, and waits for a resume operation before resuming the copy operation from the checkpoint of the last completed batch of object identifiers.

Figure 8:
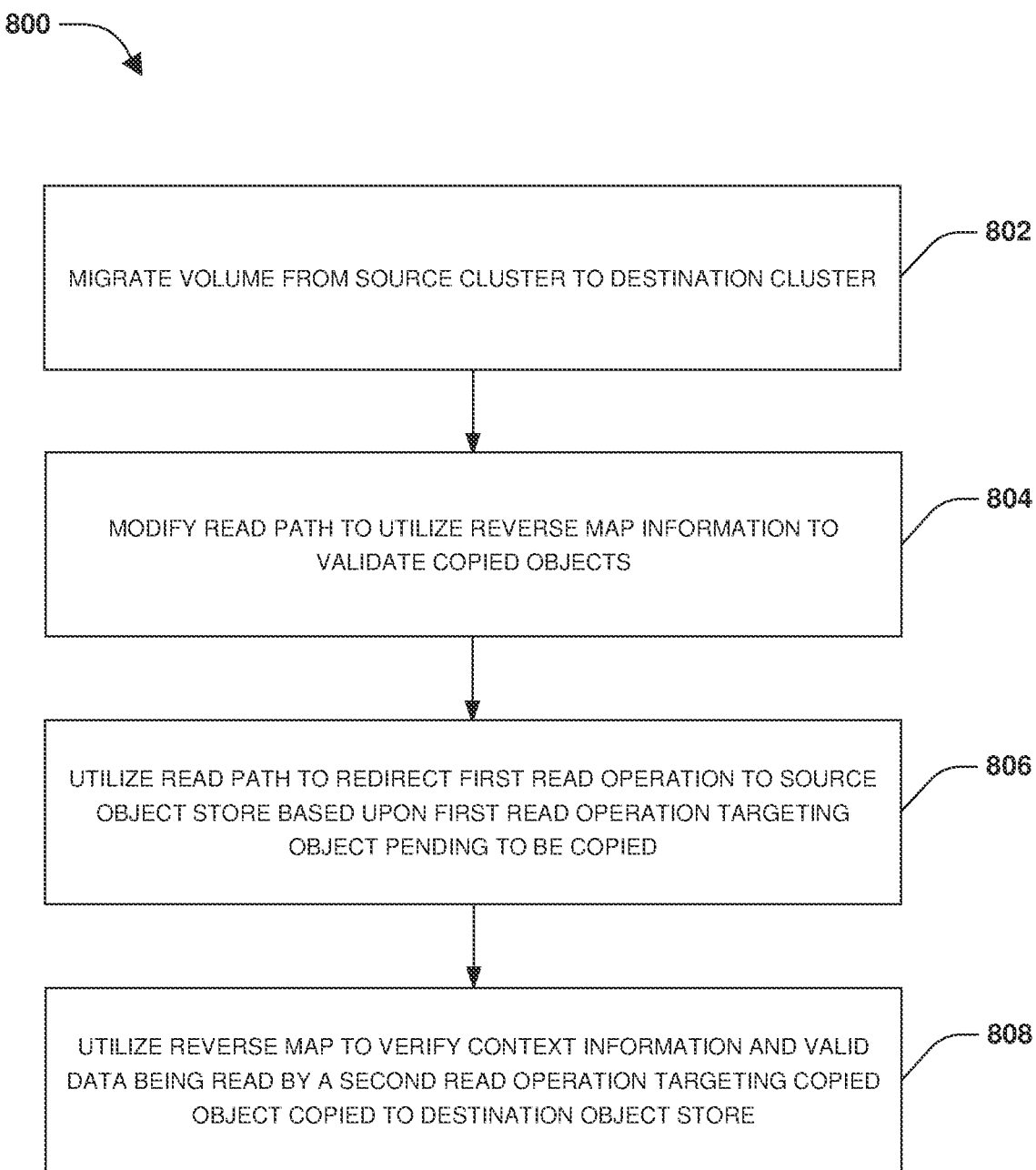
FIG. 8 is a flow chart illustrating an example method for processing read operations during a migration of a volume from a source cluster to a destination cluster in accordance with an embodiment of the present technology.
Figure 9A:
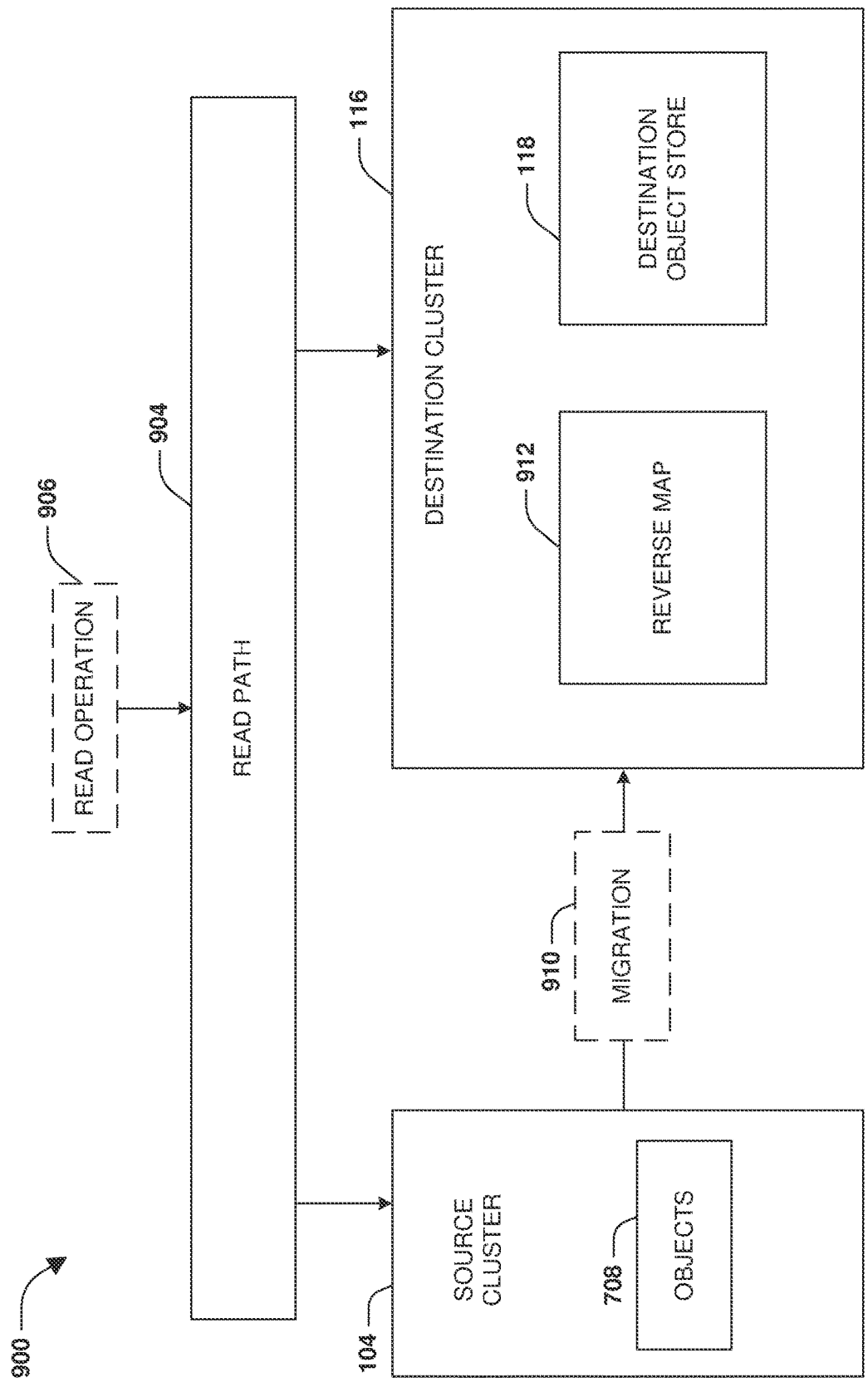
FIG. 9A is a block diagram illustrating an example of processing read operations during a migration of a volume from a source cluster to a destination cluster in accordance with an embodiment of the present technology.

FIG. 8 is a flow chart illustrating an example method 800 for processing read operations during a migration the volume from the source cluster 104 to the destination cluster 116, which is illustrated by system 900 of FIG. 9. During operation 802 of method 800, the volume is migrated 910 from the source object store 106 of the source cluster 104 to the destination object store 118 of the destination cluster 116. In some embodiments, the method 800 may be performed by the system 900 during the volume migration process described in relation to FIGS. 1-7.

Operation of the read path 904 is modified to process read operations (e.g., internal read operations, as opposed to client read operations) during the migration 910 of the objects 708 from the source cluster 104 to the destination cluster 116 for migrating the volume, during operation 804 of method 800. The read path 904 is modified to process read operations that target objects pending to be migrated 910 from the source cluster 104 to the destination cluster 116. The read path 904 is modified to process read operations that target migrated objects already migrated 910 from the source cluster 104 to the destination cluster 116.

In some embodiments, the read path 904 is modified to extend file system block context checks to include additional checks using a reverse map. That is, when a read operation 906 is processed by a file system at the destination cluster 116 for accessing the volume, the file system performs various checks such as a file system block context check. The file system block context check verifies context information associated with a block being read. If the verification fails, then a data corruption notification/response is triggered for the read operation 906 and the read operation 906 is failed. In some embodiments, the file system block context check is verified by determining whether a virtual volume block number specified by the read operation matches a virtual volume block number assigned by the destination cluster 116 for the block being read by the read operation 906. In some embodiments, the file system block context check will fail to be verified if a source based virtual volume block number does not match a virtual volume block number expected at the destination cluster 116. The source based virtual volume block number may be stored within a context area of a migrated object that includes the block being read (e.g., the migrated object may comprise a context area within which a virtual volume block number used by the source cluster 104 to reference the block when the block was stored in an object at the source object store 106). The virtual volume block number expected at the destination cluster 116 may be a virtual volume block number assigned by the destination cluster 116 (e.g., assigned by the file system) to the migrated object. The modified read path 904 modifies the filesystem block context checks to include reverse map information so that the read operation 906 can be successfully executed without a failure.

During operation 806 of method 800, the read path 904 receives a first operation targeting data of the volume. The read path 904 may determine that the first operation targets an object pending to be migrated 910 to the destination object store 118 (e.g., the object stores the data targeted by the first operation). The object still resides within the source object store 106 of the source cluster 104. Accordingly, the read path 904 is utilized to redirect the first read operation to the object stored within the source object store 106 of the source cluster 104.

During operation 808 of method 800, the read path 904 receives a second operation targeting data of the volume. The read path 904 may determine that the second operation targets a migrated object already migrated 910 to the destination object store 118 at the destination cluster 116. Accordingly, the read path 904 utilizes a reverse map 912 to verify context information and validate the data being read from the migrated object without triggering execution of the filesystem block context checks. The context information is used to avoid a virtual volume block number mismatch error from a source based virtual volume block number stored in a context area of the copied object not matching a virtual volume block number expected at the destination cluster 116. That is, the filesystem block context checks would have detected a virtual volume block number mismatch due to the source based virtual volume block number stored in the context area of the copied object not matching the virtual volume block number expected at the destination cluster 116, and would cause the second read operation to fail. However, because of the modification to the read path 904, the read path 904 utilizes the reverse map 912 to verify context information and validate data being read from the migrated object. In this way, the read path 904 is modified to process read operations from clients directed to the volume during the migration.

Figure 9B:
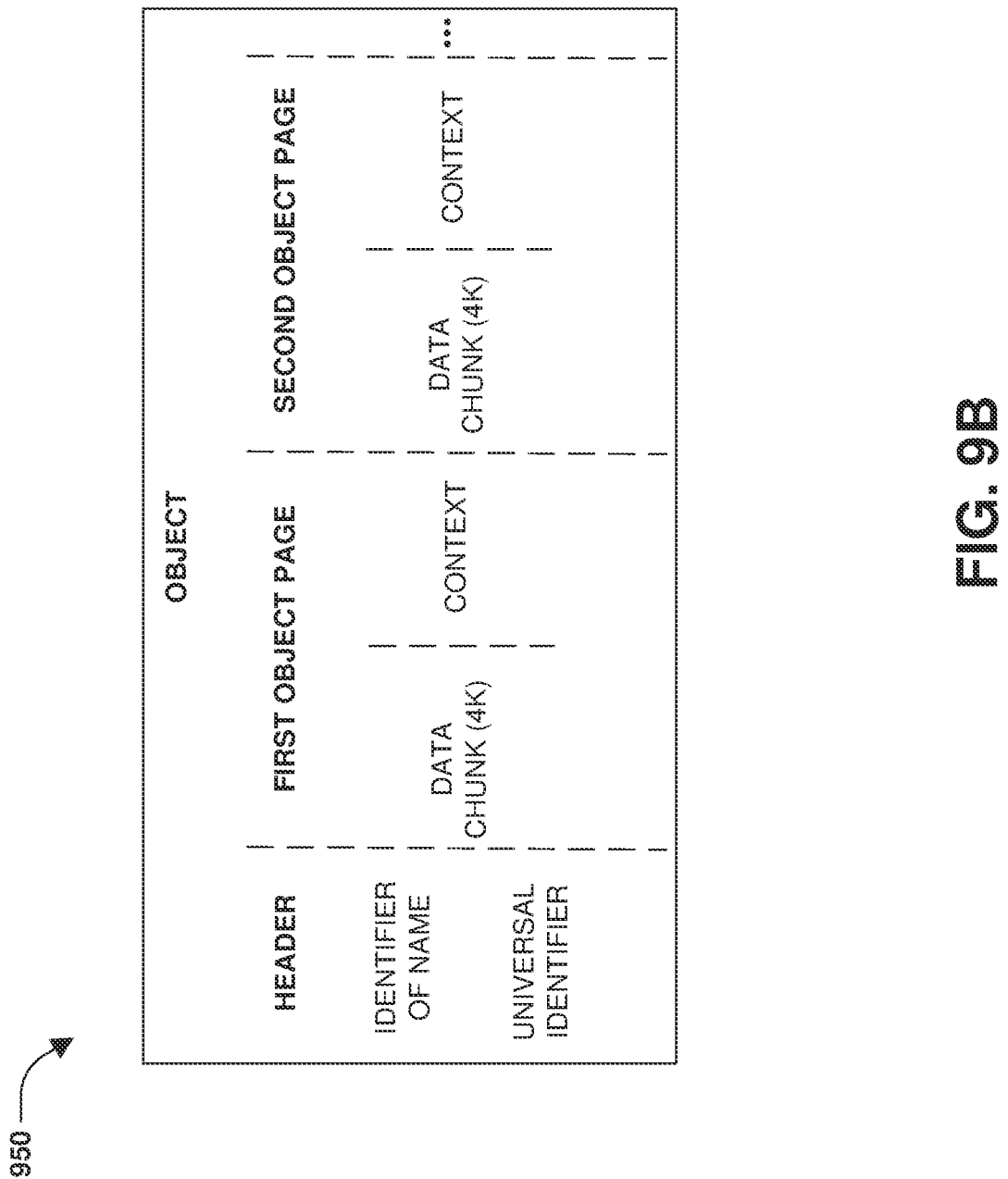
FIG. 9B is an illustration of an example of an object in accordance with an embodiment of the present technology.

In some embodiments of verifying the context information, an object 950 comprises a header, as illustrated by FIG. 9B. The header may comprise a version of the object, an indicator as to whether the object is encrypted, a creation timestamp for the object, a universal identifier uuid), an identifier of a name of the object (e.g., a hash of the name and the uuid, which can be read back after a put operation of the object or of an object page within the object to verify the hash), and/or other information. In one example, the header is 32 bytes or any other size of information.

The object may comprise one or more object pages corresponding to data chunks, such as data chunks derived from data moved from a storage tier (e.g., a performance storage tier, such as a solid state storage tier or a disk storage tier) to an object store. In one example, the object may comprise space for 1024 object pages, such as a first object page, a second object page, and/or other object pages. The first object page may comprise a first data chunk (e.g., 4 kilobytes of data or any other size of data) and a first context associated with the first object page.

The first context may comprise an indicator as to whether the object is encrypted. The first context may comprise an encryption key index used to identify an encryption key. The first context may comprise a pseudobad indicator to indicate whether data read from the local storage tier had an error such as a disk error and the data content in the object is inconsistent. The first context may comprise an indicator as to whether a RAID or storage OS marked the pseudobad error. The first context may comprise an unverified error indicator to indicate that when data read from the local storage tier resulted in an unverified RAID error. The first context may comprise a wrecked indicator that is set when data is forcefully corrupted. The first context may comprise a file block number (e.g., a location of the file block number for the first data chunk within the first volume). The first context may comprise a checksum for the first data chunk and the first context. In an example, the first context may comprise 16 bytes of information or any other size of information. The read path 904 may verify the context information by verifying information within the header of the object and/or by verifying the first context of the object.

Figure 9C:
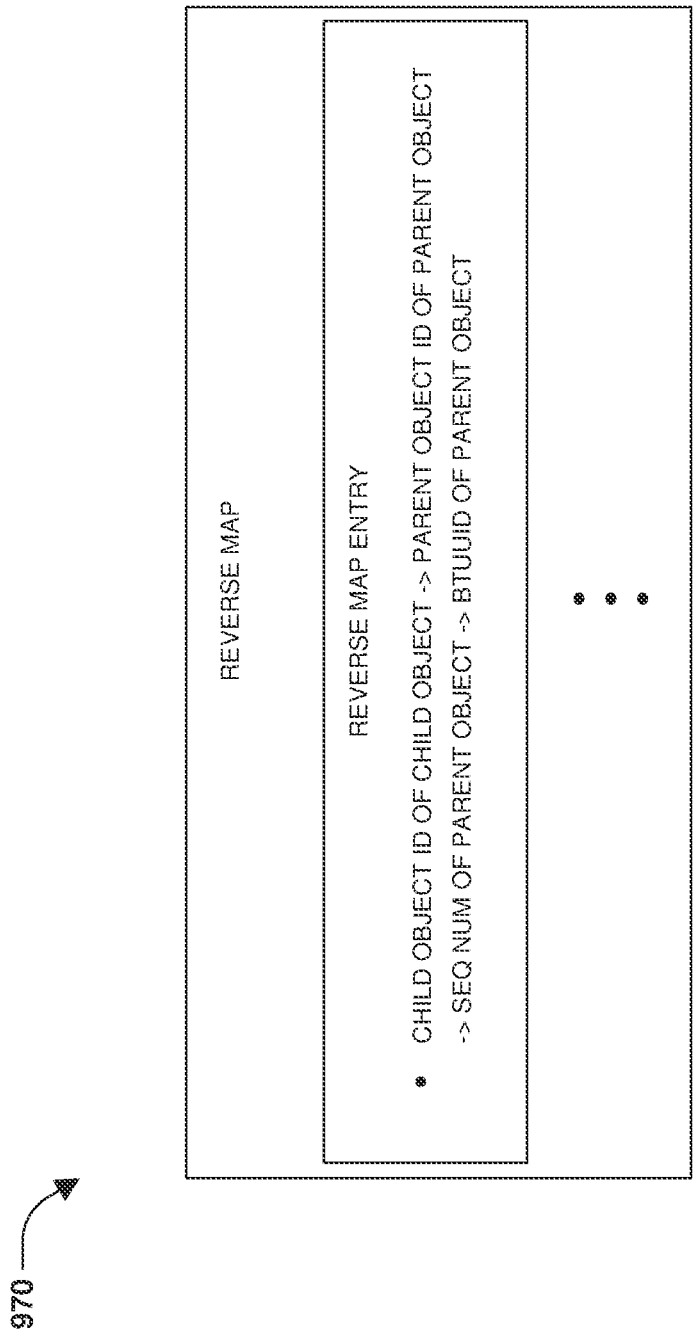
FIG. 9C is an illustration of an example of a reverse map in accordance with an embodiment of the present technology.

In some embodiments, a reverse map 970 is generated by a consistency point operation during a traversal of a container of the volume, as illustrated by FIG. 9C. During the consistency point operation, each destination object identifier that was created during the traversal and tracked within an object block info hash is processed. In some embodiments, the consistency point operation is performed using hash entries within an object block info hash (i.e., hash entries for the destination object identifiers). For a destination object identifier that is to be subsequently assigned to a destination object that will be created after the consistency point operation, an object state for the destination object is set to a copy pending state to indicate that a corresponding source object has not yet been copied (but is set to be copied/migrated) to create the destination object. The object state may be tracked within object state info.

Also, the reverse map 970 is populated with a reverse map entry that includes the destination object identifier for the destination object, a source object identifier of the source object to copy as the destination object, a sequence number of the source object (e.g., each object stored within the object store may be assigned a unique sequence number such as monotonically increasing sequence numbers for each newly created object), and/or an identifier of the source object (e.g., a universal unique identifier (UUID) that identifies a volume, a file, that comprises indirect blocks for the file such that the indirect blocks of the volume can locate data of the file). If the source object is a copy of a different object (one of the ancestor objects) due to the volume being a copy of an ancestor volume, the reverse map 970 entry may be populated with information from a source reverse map of the source object. Otherwise, the reverse map entry is populated with information from the source object if the source object is not a copy of another object. In this way, the reverse map 970 is populated with reverse map entries used to validate the creation of objects such as destination objects and whether the destination objects comprise valid data. For example, the reverse map 970 may be populated with a reverse map entry comprising a destination object identifier of a destination object, a source object identifier of a source object, a sequence number of the source object, and/or a buffer tree unique identifier (UUID) of the source object.

A verification is performed to determine whether context information of data read from a migrated object such as a destination object (e.g., information populated within a header of the destination object, such as a destination object identifier, a source object identifier, a sequence number of the source object, universal unique identifier (UUID) of the source object, and/or other information) matches information for the destination identifier populated within the reverse map 970. If the context information matches the information within the reverse map 970, then the data of the destination object is successfully returned to a client that submitted the read operation. If the context information does not match the information within the reverse map 970, then an error is returned to the client. In this way, the read path 904 verifies the context information and validates data being read from the migrated object.

In some embodiments of modifying the read path, read operations are redirected to a source object store bucket of the source object store 106 based upon the read operations targeting objects having a copy pending state. During the volume migration, the destination cluster 116 stores source object store information (e.g., a source object store bucket configuration). When a read operation is received for an object which is yet to be copied and made valid on at the destination cluster 116, the source object store information is used to redirect the read operation to the source object residing on the source object store bucket of the source object store 106, thus guaranteeing that the read operations can always be serviced. For copied/migrated objects already copied to the destination object store 118, the read path 904 uses the reverse map 970 to verify context information of the objects and to validate that the data which is read is actually what is expected. Since, the virtual volume block number (VVBN) stored in the context area of these copied objects is inherited from the source object store 106, the VVBN stored in the context area will not match the VVBN which is expected on the destination object store 118. The techniques provided here modify the read path 904 to identify these copied objects and modify file system block context VVBN checks so that read operations can proceed without flagging VVBN mismatches as data corruption.

The techniques that have been described herein provide for a cost optimized volume migration technique that avoids the costly GET operations on a source cluster and a PUT operation on a destination cluster for a block of data to migrate from a capacity tier of a source cluster to a destination cluster. This is achieved by performing backend copy operations instead of the GET and PUT operations, which results in fewer ops (less cost) and less network usage than conventional migrate techniques. The backend copy operation is implemented as a backend copy blob operation to create copies of source objects for the destination cluster.

Instead of how the prior conventional storage virtual machine migrate techniques read and transfer the actual data from the source cluster to the destination cluster, this cost optimized volume migration technique transfers metadata, about blocks located within a capacity tier of the source cluster (blocks of source objects to migrate), to the destination cluster. The metadata is used to set a special encoding type for the blocks to indicate that the blocks are in the capacity tier. The destination cluster performs backend copy operations using the metadata to create copies of the source objects for the destination cluster. A mapping metafile used to track which objects need to be copied. When the destination cluster encounters a block from a source object for the first time, a new destination object identifier is assigned at the destination cluster and a mapping is created between the source object identifier and the new destination object identifier within the mapping metafile.

A metafile (an object copy work queue) is maintained at the destination cluster. The object copy work queue is used to track pending copy work of the backend copy operations that still need to be processed. The object copy work queue is populated with object copy tracking metadata such as object identifiers that will be processed by an object copy driver module. An incoming data transfer enqueues the object identifiers within the object copy work queue.

The object copy driver module processes the object copy work queue in order to perform the backend copy operations for migrating the volume from the source cluster to the destination cluster (e.g., a Vserver migration).

The object copy driver module periodically dispatches worker messages that issue the backend copy operations for the object identifiers within the object copy work queue. In particular, the object copy driver module dequeues a batch of object identifiers and sends copy requests to the destination object store bucket. Persistent checkpoints are maintained for the object copy work queue so that inflight batches of object identifiers can be tracked. The persistent checkpoints are used to identify a next object that needs to be copied. Both the object copy work queue and the object copy driver module are responsible for guaranteeing that all blocks from the source cluster (sender) are copied into valid objects at the destination cluster.

Additionally, modifications are made to a read path for how to process read operations directed to objects pending to be copied and for already copied objects from the source cluster to the destination cluster. When a read operation targets an object pending to be copied, the read operation is redirected to the source object store bucket to read the object. When a read operation targets a valid object at the destination, source object store information will be used to redirect the read to the object residing on the source object store bucket. For the read targeting the valid object, a reverse map is used to verify context information and validate the data being read. This is necessary because the virtual volume block number (VVBN) stored in the context area of the copied objects is related to the source cluster and will not match the VVBN that is expected at the destination cluster. Accordingly, the read path is modified to extend file system block context VVBN to include additional checks using a reverse map.

In this way, the object copy driver module uses the object copy work queue populated with the metadata from the source cluster to issue backend copy operations (copy requests) for migrating the volume from the source cluster to the destination cluster, which results in less ops (cost) and bandwidth because there is no longer a need to perform multiple GET and PUT operations such as for blocks that are located in a capacity tier of the source cluster. Additionally, read operations directed to already copied objects and objects pending to be copied can be performed during the migration without triggering data corruption problems because the read path is modified to appropriately handle read operations directed to the already copied objects and the objects pending to be copied.

In some embodiments, a method is provided. The method includes receiving a request to migrate a volume from a source cluster to a destination cluster, wherein data of the volume is stored across a source storage tier and a source capacity tier of a source object store; evaluating the source object store to identify a set of objects of the volume that are stored within the source capacity tier; encoding, by a transfer engine, metadata for the set of objects to create encoded metadata indicating that the set of objects are stored within the source capacity tier; transferring the encoded metadata to the destination cluster for creating copies of the set of objects within a destination capacity tier of a destination object store for the destination cluster; and utilizing the encoded metadata to perform backend object copy operations to store copies of the set of objects into the destination capacity tier for migrating the volume.

In some embodiments, the method includes: in response to encountering a block from the set of objects for a first time, assigning a new destination object identifier at the destination cluster for the block.

In some embodiments, the method includes: in response to encountering a block from the set of objects for a first time, creating a mapping between a source object identifier used by the source cluster to reference the block and a new destination object identifier assigned for the block at the destination cluster.

In some embodiments, the method includes: in response to encountering a block from the set of objects for a first time, storing a copy of a block into the destination capacity tier based upon a mapping between a source object identifier used by the source cluster to reference the block and a new destination object identifier assigned for the block at the destination cluster.

In some embodiments, the method includes: in response to determining that a block from the set of objects does not belong to a valid object, reading and transferring data of the block from the source object store to the destination object store.

In some embodiments, the method includes determining that a block from the set of objects does not belong to a valid object; generating a placement indicator to specify that the block resides in the source capacity tier; and reading and transferring the placement indicator and data of the block from the source object store to the destination object store.

In some embodiments, the method includes determining that a block from the set of objects belongs to an object identified as being a valid object; reading object metadata and block information for the object; and in response to the object metadata and block information comprising an entry for the object, incrementing a reference count specified by the entry.

In some embodiments, the method includes determining that a block from the set of objects belongs to an object identified as being a valid object; reading object metadata and block information for the object; and in response to the object metadata and block information does not comprise an entry for the object, adding a new object identifier for the object at the destination object store into an object mapping file.

In some embodiments, the method includes in response to determining that a block from the set of objects does not belong to a valid object, generating a placement indicator to specify that the block resides in the source capacity tier; reading and transferring the placement indicator and data of the block from the source object store to the destination object store; and in response to the block not being present within object metadata and block information, utilizing the placement indicator to write the data of the block to a new object at the destination capacity tier.

In some embodiments, a computing device is provided. The computing device includes memory comprising machine executable code, and a processor coupled to the memory, the processor configured to execute the machine executable code to cause the processor to: receive a request to migrate a volume from a source cluster to a destination cluster, wherein data of the volume is stored across a source storage tier and a source capacity tier of a source object store; evaluate the source object store to identify a set of objects of the volume that are stored within the source capacity tier; encode, by a transfer engine, metadata for the set of objects to create encoded metadata indicating that the set of objects are stored within the source capacity tier; transfer the encoded metadata to the destination cluster for creating copies of the set of objects within a destination capacity tier of a destination object store for the destination cluster; and utilize the encoded metadata to perform backend object copy operations to store copies of the set of objects into the destination capacity tier for migrating the volume.

In some embodiments, the machine executable code causes the processor to perform a consistency point to persist objects to persistent storage; and in response to determining that an object to persist has not been allocated a new object identifier, increment a reference count of an existing object identifier of the object.

In some embodiments, the machine executable code causes the processor to perform a consistency point at the destination object store to persist objects to persistent storage; and in response to determining that an object to persist has been allocated a new object identifier, transition a state for the object to a pending copy state.

In some embodiments, the machine executable code causes the processor to perform a consistency point at the destination object store to persist objects to persistent storage; and in response to determining that an object to persist has been allocated a new object identifier, add a reverse map entry with context information for the object.

In some embodiments, the machine executable code causes the processor to perform a consistency point at the destination object store to persist objects to persistent storage; and in response to determining that an object to persist has been allocated a new object identifier, add the new object identifier to an object copy work queue used to perform the backend object copy operations.

In some embodiments, non-transitory machine readable medium is provided. The non-transitory machine readable medium comprises instructions for performing a method, which when executed by a machine, causes the machine to receive a request to migrate a volume from a source cluster to a destination cluster, wherein data of the volume is stored across a source storage tier and a source capacity tier of a source object store; evaluate the source object store to identify a set of objects of the volume that are stored within the source capacity tier; encode, by a transfer engine, metadata for the set of objects to create encoded metadata indicating that the set of objects are stored within the source capacity tier; transfer the encoded metadata to the destination cluster for creating copies of the set of objects within a destination capacity tier of a destination object store for the destination cluster; and utilize the encoded metadata to perform backend object copy operations to store copies of the set of objects into the destination capacity tier for migrating the volume.

In some embodiments, the instructions cause the machine to: in response to encountering a block from the set of objects for a first time, assign a new destination object identifier at the destination cluster for the block.

In some embodiments, the instructions cause the machine to: in response to encountering a block from the set of objects for a first time, create a mapping between a source object identifier used by the source cluster to reference the block and a new destination object identifier assigned for the block at the destination cluster.

In some embodiments, the instructions cause the machine to: in response to encountering a block from the set of objects for a first time, store a copy of a block into the destination capacity tier based upon a mapping between a source object identifier used by the source cluster to reference the block and a new destination object identifier assigned for the block at the destination cluster.

In some embodiments, the instructions cause the machine to: in response to determining that a block from the set of objects does not belong to a valid object, read and transfer data of the block from the source object store to the destination object store.

In some embodiments, the instructions cause the machine to perform a consistency point at the destination object store to persist objects to persistent storage; and in response to determining that an object to persist has not been allocated a new object identifier, increment a reference count of an existing object identifier of the object.

In some embodiments, a method is provided. The method includes maintaining an object copy work queue at a destination cluster to which objects storing data of a volume are to be migrated from a source cluster that stores the objects across a source storage tier and a source capacity tier of a source object store; populating the object copy work queue with pending copy work entries comprising object identifiers of objects to copy from the source object store to a destination object store of the destination cluster by an object copy driver module; and processing, by the object copy driver module, the pending copy work entries to copy the objects into the destination object store for migrating the volume.

In some embodiments, the method includes dispatching a batch of worker messages to issue backend copy operations for a batch of object identifiers within pending copy work entries for storing a set of object with the object identifiers into the destination object store.

In some embodiments, the method includes dispatching a batch of worker messages to issue backend copy operations for a batch of object identifiers within pending copy work entries; and generating a persistent checkpoint for the batch of object identifiers to track inflight backend copy operations pending for completion.

In some embodiments, the method includes dispatching a batch of worker messages to issue backend copy operations for a batch of object identifiers within pending copy work entries; generating a persistent checkpoint for the batch of object identifiers to track inflight backend copy operations pending for completion; and utilizing the persistent checkpoint to identify a next object to copy to the destination object store.

In some embodiments, the method includes dispatching a batch of worker messages to issue backend copy operations for a batch of object identifiers within pending copy work entries; generating a persistent checkpoint for the batch of object identifiers to track inflight backend copy operations pending for completion; and utilizing the object copy work queue to ensure that all blocks are copied from the source object store into valid objects at the destination object store.

In some embodiments, the method includes modifying a read path, implemented to process read operations targeting objects pending to be copied and already copied objects as part of migrating the volume, to extend file system block context checks, wherein the modified read path is implemented for executing the read operations with correct checks to detect data corruption.

In some embodiments, the method includes modifying a read path, implemented to process read operations targeting objects pending to be copied and already copied objects as part of migrating the volume, to extend file system block context checks, wherein the modified read path is implemented for executing the read operations with correct checks to detect data corruption; and in response to receiving a read operation targeting an object pending to be copied, utilizing the read path to redirect the read operation to the source object store.

In some embodiments, the method includes modifying a read path, implemented to process read operations targeting objects pending to be copied and already copied objects as part of migrating the volume, to extend file system block context checks, wherein the modified read path is implemented for executing the read operations with correct checks to detect data corruption; and in response to receiving a second read operation targeting a migrated object copied to the destination object store, utilizing a reverse map to verify context information and validate data being read from the copied object, wherein the read path utilizes the context information to avoid a virtual volume block number mismatch error from a source based virtual volume block number stored in a context area of the copied object not matching a virtual volume block number expected at the destination cluster.

In some embodiments, the method includes receiving a read operation targeting a migrated object copied to the destination object store; and utilizing the read path and a reverse map to verify context information and validate data being read from the copied object, wherein the context information is verified to avoid a virtual volume block number mismatch error from a source based virtual volume block number stored in a context area of the copied object not matching a virtual volume block number expected at the destination cluster.

In some embodiments, a computing device is provided. The computing device includes memory comprising machine executable code, and a processor coupled to the memory, the processor configured to execute the machine executable code to cause the processor to: maintain an object copy work queue at a destination cluster to which objects storing data of a volume are to be migrated from a source cluster that stores the objects across a source storage tier and a source capacity tier of a source object store; populate the object copy work queue with pending copy work entries comprising object identifiers of objects to copy from the source object store to a destination object store of the destination cluster by an object copy driver module; and process, by the object copy driver module, the pending copy work entries to copy the objects into the destination object store for migrating the volume.

In some embodiments, the machine executable code causes the processor to dispatch a batch of worker messages to issue backend copy operations for a batch of object identifiers within pending copy work entries for storing a set of object with the object identifiers into the destination object store.

In some embodiments, the machine executable code causes the processor to dispatch a batch of worker messages to issue backend copy operations for a batch of object identifiers within pending copy work entries; and generate a persistent checkpoint for the batch of object identifiers to track inflight backend copy operations pending for completion.

In some embodiments, the machine executable code causes the processor to dispatch a batch of worker messages to issue backend copy operations for a batch of object identifiers within pending copy work entries; generate a persistent checkpoint for the batch of object identifiers to track inflight backend copy operations pending for completion; and utilize the persistent checkpoint to identify a next object to copy to the destination object store.

In some embodiments, the machine executable code causes the processor to dispatch a batch of worker messages to issue backend copy operations for a batch of object identifiers within pending copy work entries; generate a persistent checkpoint for the batch of object identifiers to track inflight backend copy operations pending for completion; and utilize the object copy work queue to ensure that all blocks are copied from the source object store into valid objects at the destination object store.

In some embodiments, non-transitory machine readable medium is provided. The non-transitory machine readable medium comprises instructions for performing a method, which when executed by a machine, causes the machine to maintain an object copy work queue at a destination cluster to which objects storing data of a volume are to be migrated from a source cluster that stores the objects across a source storage tier and a source capacity tier of a source object store; populate the object copy work queue with pending copy work entries comprising object identifiers of objects to copy from the source object store to a destination object store of the destination cluster by an object copy driver module; and process, by the object copy driver module, the pending copy work entries to copy the objects into the destination object store for migrating the volume.

In some embodiments, the instructions cause the machine to dispatch a batch of worker messages to issue backend copy operations for a batch of object identifiers within pending copy work entries for storing a set of object with the object identifiers into the destination object store.

In some embodiments, the instructions cause the machine to dispatch a batch of worker messages to issue backend copy operations for a batch of object identifiers within pending copy work entries; and generate a persistent checkpoint for the batch of object identifiers to track inflight backend copy operations pending for completion.

In some embodiments, the instructions cause the machine to dispatch a batch of worker messages to issue backend copy operations for a batch of object identifiers within pending copy work entries; generate a persistent checkpoint for the batch of object identifiers to track inflight backend copy operations pending for completion; and utilize the persistent checkpoint to identify a next object to copy to the destination object store.

In some embodiments, the instructions cause the machine to dispatch a batch of worker messages to issue backend copy operations for a batch of object identifiers within pending copy work entries; generate a persistent checkpoint for the batch of object identifiers to track inflight backend copy operations pending for completion; and utilize the object copy work queue to ensure that all blocks are copied from the source object store into valid objects at the destination object store.

In some embodiments, the instructions cause the machine to modify a read path, implemented to process read operations targeting objects pending to be copied and already copied objects as part of migrating the volume, to extend file system block context checks, wherein the modified read path is implemented for executing the read operations with correct checks to detect data corruption; in response to receiving a first read operation targeting an object pending to be copied, utilize the read path to redirect the read operation to the source object store; and in response to receiving a second read operation targeting a migrated object copied to the destination object store, utilizing a reverse map to verify context information and validate data being read from the copied object, wherein the read path utilizes the context information to avoid a virtual volume block number mismatch error from a source based virtual volume block number stored in a context area of the copied object not matching a virtual volume block number expected at the destination cluster.

In some embodiments, a method is provided. The method includes migrating objects from a source cluster to a destination cluster; modifying a read path, implemented to process read operations targeting objects pending to be copied and already copied objects as part of migrating the objects, to extend file system block context checks; and redirecting, by the modified read path during the migration, a read operation to the source cluster based upon the read operation targeting an object pending to be copied or redirecting the read operation to the destination cluster based upon the read operation targeting a copied object, wherein the modified read path modifies a file system block context check to include reverse map information for the read operation redirected to the destination cluster.

In some embodiments, the modified read path is implemented for executing the read operations with correct checks to detect data corruption.

In some embodiments, the method includes receiving a first read operation targeting the object pending to be copied; and utilizing the modified read path to redirect the first read operation to a source object store of the source cluster.

In some embodiments, the method includes receiving a first read operation targeting the copied object copied to a destination object store of the destination cluster; and utilizing a reverse map to verify context information and validate data being read from the copied object.

In some embodiments, the method includes receiving a first read operation targeting the copied object copied to a destination object store of the destination cluster; and verifying context information of data being read from the copied object with correct checks to detect data corruption.

In some embodiments, the method includes receiving a first read operation targeting the copied object copied to a destination object store of the destination cluster; and validating data being read from the copied object with correct checks to detect data corruption.

In some embodiments, the method includes receiving a first read operation targeting the copied object copied to a destination object store of the destination cluster; and utilizing, by the modified read path, context information to avoid a virtual volume block number mismatch error from a source based virtual volume block number stored in a context area of the copied object not matching a virtual volume block number expected at the destination cluster.

In some embodiments, a computing device is provided. The computing device includes memory comprising machine executable code, and a processor coupled to the memory, the processor configured to execute the machine executable code to cause the processor to: migrate objects from a source cluster to a destination cluster; modify a read path, implemented to process read operations targeting objects pending to be copied and already copied objects as part of migrating the objects, to extend file system block context checks; and redirect, by the modified read path during the migration, a read operation to the source cluster based upon the read operation targeting an object pending to be copied or redirecting the read operation to the destination cluster based upon the read operation targeting a copied object, wherein the modified read path modifies a file system block context check to include reverse map information for the read operation redirected to the destination cluster.

In some embodiments, the modified read path is implemented for executing the read operations with correct checks to detect data corruption.

In some embodiments, the machine executable code causes the processor to receive a first read operation targeting the object pending to be copied; and utilize the modified read path to redirect the first read operation to a source object store of the source cluster.

In some embodiments, the machine executable code causes the processor to receive a first read operation targeting the copied object copied to a destination object store of the destination cluster; and utilize a reverse map to verify context information and validate data being read from the copied object.

In some embodiments, the machine executable code causes the processor to receive a first read operation targeting the copied object copied to a destination object store of the destination cluster; and verify context information of data being read from the copied object with correct checks to detect data corruption.

In some embodiments, the machine executable code causes the processor to receive a first read operation targeting the copied object copied to a destination object store of the destination cluster; and validate data being read from the copied object with correct checks to detect data corruption.

In some embodiments, the machine executable code causes the processor to receive a first read operation targeting the copied object copied to a destination object store of the destination cluster; and utilize, by the modified read path, context information to avoid a virtual volume block number mismatch error from a source based virtual volume block number stored in a context area of the copied object not matching a virtual volume block number expected at the destination cluster.

In some embodiments, a computing device is provided. The computing device includes memory comprising machine executable code, and a processor coupled to the memory, the processor configured to execute the machine executable code to cause the processor to: migrate objects from a source cluster to a destination cluster; modify a read path, implemented to process read operations targeting objects pending to be copied and already copied objects as part of migrating the objects, to extend file system block context checks; and redirect, by the modified read path during the migration, a read operation to the source cluster based upon the read operation targeting an object pending to be copied or redirecting the read operation to the destination cluster based upon the read operation targeting a copied object, wherein the modified read path modifies a file system block context check to include reverse map information for the read operation redirected to the destination cluster.

In some embodiments, the modified read path is implemented for executing the read operations with correct checks to detect data corruption.

In some embodiments, the machine executable code causes the processor to receive a first read operation targeting the object pending to be copied; and utilize the modified read path to redirect the first read operation to a source object store of the source cluster.

In some embodiments, the machine executable code causes the processor to receive a first read operation targeting the copied object copied to a destination object store of the destination cluster; and utilize a reverse map to verify context information and validate data being read from the copied object.

In some embodiments, the machine executable code causes the processor to receive a first read operation targeting the copied object copied to a destination object store of the destination cluster; and verify context information of data being read from the copied object with correct checks to detect data corruption.

In some embodiments, the machine executable code causes the processor to receive a first read operation targeting the copied object copied to a destination object store of the destination cluster; and validate data being read from the copied object with correct checks to detect data corruption.

Figure 10:
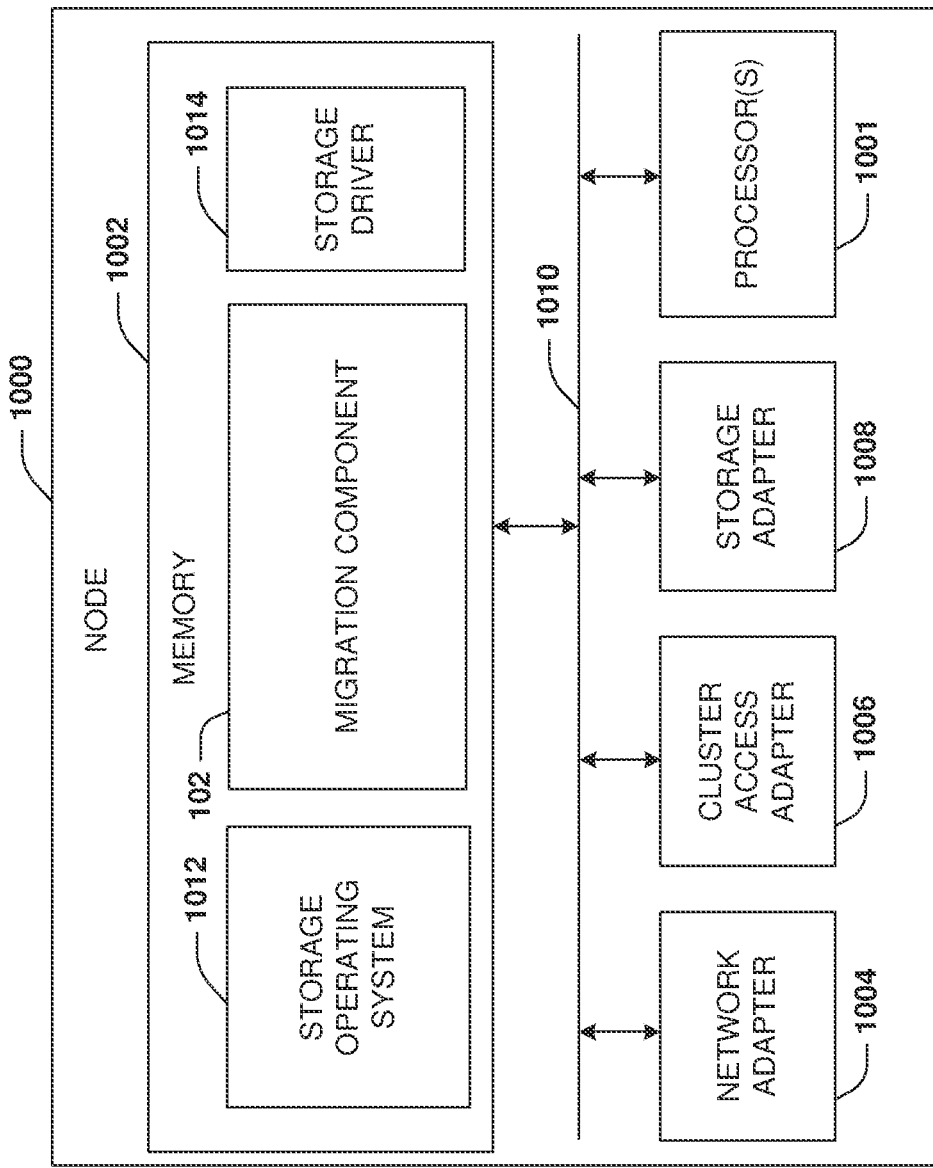
FIG. 10 is a block diagram illustrating an example of a node in accordance with an embodiment of the present technology.

Referring to FIG. 10, a node 1000 (also referred to as a storage node) in this particular example includes processor(s) 1001, a memory 1002, a network adapter 1004, a cluster access adapter 1006, and a storage adapter 1008 interconnected by a system bus 1010. In other examples, the node 1000 comprises a virtual machine, such as a virtual storage machine.

The node 1000 also includes a storage operating system 1012 installed in the memory 1002 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc.

The network adapter 1004 in this example includes the mechanical, electrical and signaling circuitry needed to connect the node 1000 to one or more of the client devices over network connections, which may comprise, among other things, a point-to-point connection or a shared medium, such as a local area network. In some examples, the network adapter 1004 further communicates (e.g., using Transmission Control Protocol/Internet Protocol (TCP/IP)) via a cluster fabric and/or another network (e.g., a WAN (Wide Area Network)) (not shown) with storage devices of a distributed storage system to process storage operations associated with data stored thereon.

The storage adapter 1008 cooperates with the storage operating system 1012 executing on the node 1000 to access information requested by one of the client devices (e.g., to access data on a data storage device managed by a network storage controller). The information may be stored on any type of attached array of writeable media such as magnetic disk drives, flash memory, and/or any other similar media adapted to store information.

In exemplary data storage devices, information can be stored in data blocks on disks. The storage adapter 1008 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 1008 and, if necessary, processed by the processor(s) 1001 (or the storage adapter 1008 itself) prior to being forwarded over the system bus 1010 to the network adapter 1004 (and/or the cluster access adapter 1006 if sending to another node computing device in the cluster) where the information is formatted into a data packet and returned to a requesting one of the client devices and/or sent to another node computing device attached via a cluster fabric. In some examples, a storage driver 1014 in the memory 1002 interfaces with the storage adapter to facilitate interactions with the data storage devices.

The storage operating system 1012 can also manage communications for the node 1000 among other devices that may be in a clustered network, such as attached to the cluster fabric. Thus, the node 1000 can respond to client device requests to manage data on one of the data storage devices or storage devices of the distributed storage system in accordance with the client device requests.

The node 1000 may implement a migration component 102 configured to perform the techniques described herein such as in relation to FIGS. 1-9. For example, the migration component 102 may be configured to migrate a volume from the source cluster 104 to the destination cluster 116.

In the example node 1000, memory 1002 can include storage locations that are addressable by the processor(s) 1001 and adapters 1004, 1006, and 1008 for storing related software application code and data structures. The processor(s) 1001 and adapters 1004, 1006, and 1008 may, for example, include processing elements and/or logic circuitry configured to execute the software code and manipulate the data structures.

The storage operating system 1012, portions of which are typically resident in the memory 1002 and executed by the processor(s) 1001, invokes storage operations in support of a file service implemented by the node 1000. Other processing and memory mechanisms, including various computer readable media, may be used for storing and/or executing application instructions pertaining to the techniques described and illustrated herein.

The examples of the technology described and illustrated herein may be embodied as one or more non-transitory computer or machine readable media, such as the memory 1002, having machine or processor-executable instructions stored thereon for one or more aspects of the present technology, which when executed by processor(s), such as processor(s) 1001, cause the processor(s) to carry out the steps necessary to implement the methods of this technology, as described and illustrated with the examples herein. In some examples, the executable instructions are configured to perform one or more steps of a method described and illustrated later.

Figure 11:
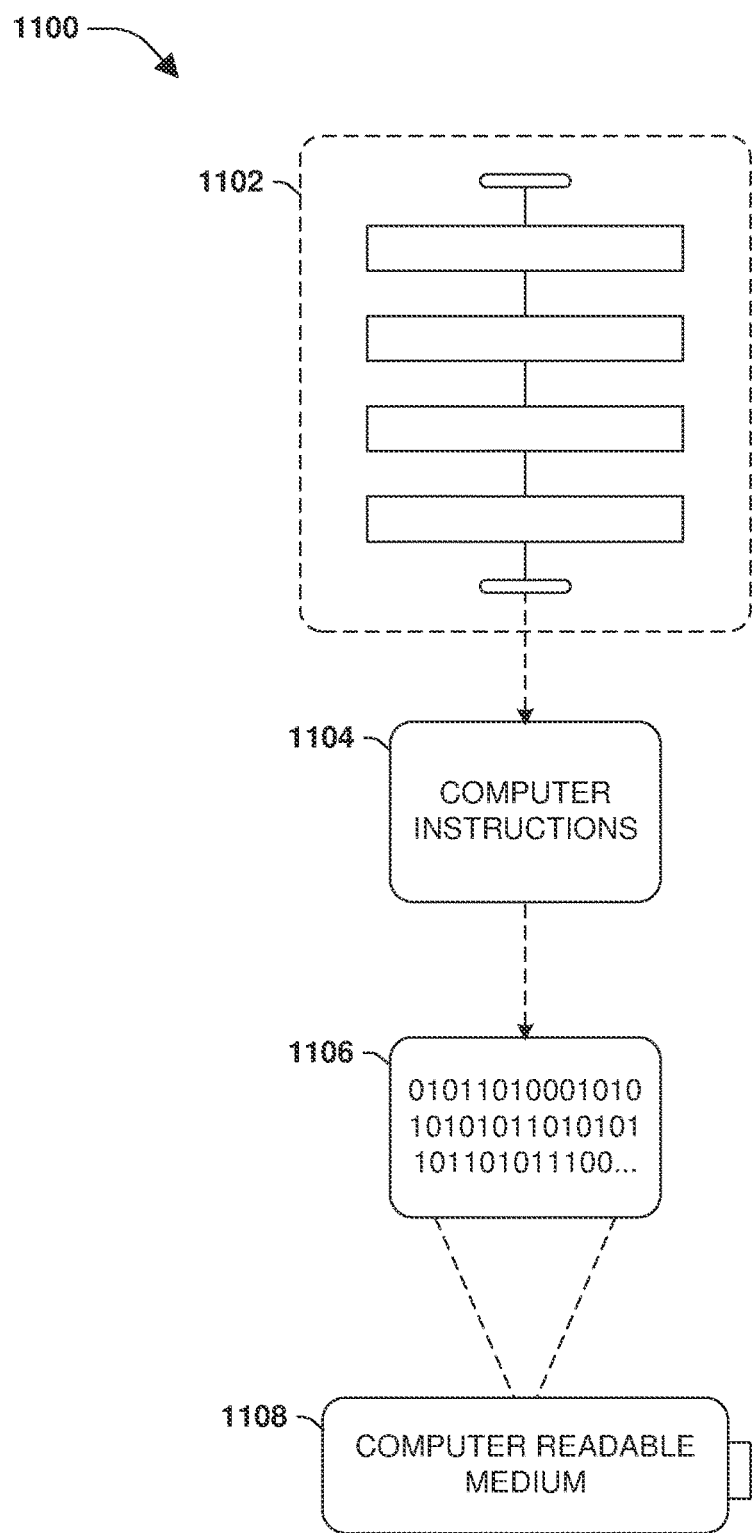
FIG. 11 is an example of a computer readable medium in which an embodiment of the present technology may be implemented.

Still another embodiment involves a computer-readable medium 1100 comprising processor-executable instructions configured to implement one or more of the techniques presented herein. An example embodiment of a computer-readable medium or a computer-readable device that is devised in these ways is illustrated in FIG. 11, wherein the implementation comprises a computer-readable medium 1108, such as a compact disc-recordable (CD-R), a digital versatile disc-recordable (DVD-R), flash drive, a platter of a hard disk drive, etc., on which is encoded computer-readable data 1106. This computer-readable data 1106, such as binary data comprising at least one of a zero or a one, in turn comprises processor-executable computer instructions 1104 configured to operate according to one or more of the principles set forth herein. In some embodiments, the processor-executable computer instructions 1104 are configured to perform a method 1102 such as method 200 of FIG. 2, method 400 of FIG. 4, method 500 of FIG. 5, method 600 of FIG. 6, and/or method 800 of FIG. 8. In some embodiments, the processor-executable computer instructions 1104 are configured to implement a system such as system 100 of FIG. 1, system 300 of FIG. 3, system 700 of FIG. 7, and/or system 900 of FIG. 9A. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    maintaining an object copy work queue at a destination cluster to which objects storing data of a volume are to be migrated from a source cluster that stores the objects across a source storage tier and a source capacity tier of a source object store;
    populating the object copy work queue with pending copy work entries comprising object identifiers of objects to copy from the source object store to a destination object store of the destination cluster by an object copy driver module; and
    processing, by the object copy driver module, the pending copy work entries to copy the objects into the destination object store for migrating the volume.

2. The method of claim 1, wherein the processing comprises:
    dispatching a batch of worker messages to issue backend copy operations for a batch of object identifiers within pending copy work entries for storing a set of object with the object identifiers into the destination object store.

3. The method of claim 1, wherein the processing comprises:
    dispatching a batch of worker messages to issue backend copy operations for a batch of object identifiers within pending copy work entries; and
    generating a persistent checkpoint for the batch of object identifiers to track inflight backend copy operations pending for completion.

4. The method of claim 1, wherein the processing comprises:
    dispatching a batch of worker messages to issue backend copy operations for a batch of object identifiers within pending copy work entries;
    generating a persistent checkpoint for the batch of object identifiers to track inflight backend copy operations pending for completion; and
    utilizing the persistent checkpoint to identify a next object to copy to the destination object store.

5. The method of claim 1, wherein the processing comprises:
    dispatching a batch of worker messages to issue backend copy operations for a batch of object identifiers within pending copy work entries;
    generating a persistent checkpoint for the batch of object identifiers to track inflight backend copy operations pending for completion; and
    utilizing the object copy work queue to ensure that all blocks are copied from the source object store into valid objects at the destination object store.

6. The method of claim 1, comprising:
    modifying a read path, implemented to process read operations targeting objects pending to be copied and already copied objects as part of migrating the volume, to extend file system block context checks, wherein the modified read path is implemented for executing the read operations with correct checks to detect data corruption.

7. The method of claim 1, comprising:
    modifying a read path, implemented to process read operations targeting objects pending to be copied and already copied objects as part of migrating the volume, wherein the modified read path is implemented for executing the read operations with correct checks to detect data corruption; and
    in response to receiving a read operation targeting an object pending to be copied, utilizing the read path to redirect the read operation to the source object store.

8. The method of claim 1, comprising:
    modifying a read path, implemented to process read operations targeting objects pending to be copied and already copied objects as part of migrating the volume, to extend file system block context checks, wherein the modified read path is implemented for executing the read operations with correct checks to detect data corruption; and
    in response to receiving a second read operation targeting a copied object copied to the destination object store, utilizing a reverse map to verify context information and validate data being read from the copied object, wherein the read path utilizes the context information to avoid a virtual volume block number mismatch error from a source based virtual volume block number stored in a context area of the copied object not matching a virtual volume block number expected at the destination cluster.

9. The method of claim 1, comprising:
receiving a read operation targeting a copied object copied to the destination object store; and
utilizing the read path and a reverse map to verify context information and validate data being read from the copied object, wherein the context information is verified to avoid a virtual volume block number mismatch error from a source based virtual volume block number stored in a context area of the copied object not matching a virtual volume block number expected at the destination cluster.

10. A computing device comprising:
a memory comprising machine executable code; and
a processor coupled to the memory, the processor configured to execute the machine executable code to cause the processor to:
maintain an object copy work queue at a destination cluster to which objects storing data of a volume are to be migrated from a source cluster that stores the objects across a source storage tier and a source capacity tier of a source object store;
populate the object copy work queue with pending copy work entries comprising object identifiers of objects to copy from the source object store to a destination object store of the destination cluster by an object copy driver module; and
process, by the object copy driver module, the pending copy work entries to copy the objects into the destination object store for migrating the volume.

11. The computing device of claim 10, wherein the machine executable code causes the processor to:
dispatch a batch of worker messages to issue backend copy operations for a batch of object identifiers within pending copy work entries for storing a set of object with the object identifiers into the destination object store.

12. The computing device of claim 10, wherein the machine executable code causes the processor to:
dispatch a batch of worker messages to issue backend copy operations for a batch of object identifiers within pending copy work entries; and
generate a persistent checkpoint for the batch of object identifiers to track inflight backend copy operations pending for completion.

13. The computing device of claim 10, wherein the machine executable code causes the processor to:
dispatch a batch of worker messages to issue backend copy operations for a batch of object identifiers within pending copy work entries;
generate a persistent checkpoint for the batch of object identifiers to track inflight backend copy operations pending for completion; and
utilize the persistent checkpoint to identify a next object to copy to the destination object store.

14. The computing device of claim 10, wherein the machine executable code causes the processor to:
dispatch a batch of worker messages to issue backend copy operations for a batch of object identifiers within pending copy work entries;
generate a persistent checkpoint for the batch of object identifiers to track inflight backend copy operations pending for completion; and
utilize the object copy work queue to ensure that all blocks are copied from the source object store into valid objects at the destination object store.

15. A non-transitory machine readable medium comprising instructions for performing a method, which when executed by a machine, causes the machine to:
maintain an object copy work queue at a destination cluster to which objects storing data of a volume are to be migrated from a source cluster that stores the objects across a source storage tier and a source capacity tier of a source object store;
populate the object copy work queue with pending copy work entries comprising object identifiers of objects to copy from the source object store to a destination object store of the destination cluster by an object copy driver module; and
process, by the object copy driver module, the pending copy work entries to copy the objects into the destination object store for migrating the volume.

16. The non-transitory machine readable medium of claim 15, wherein the instructions cause the machine to:
dispatch a batch of worker messages to issue backend copy operations for a batch of object identifiers within pending copy work entries for storing a set of object with the object identifiers into the destination object store.

17. The non-transitory machine readable medium of claim 15, wherein the instructions cause the machine to:
dispatch a batch of worker messages to issue backend copy operations for a batch of object identifiers within pending copy work entries; and
generate a persistent checkpoint for the batch of object identifiers to track inflight backend copy operations pending for completion.

18. The non-transitory machine readable medium of claim 15, wherein the instructions cause the machine to:
dispatch a batch of worker messages to issue backend copy operations for a batch of object identifiers within pending copy work entries;
generate a persistent checkpoint for the batch of object identifiers to track inflight backend copy operations pending for completion; and
utilize the persistent checkpoint to identify a next object to copy to the destination object store.

19. The non-transitory machine readable medium of claim 15, wherein the instructions cause the machine to:
dispatch a batch of worker messages to issue backend copy operations for a batch of object identifiers within pending copy work entries;
generate a persistent checkpoint for the batch of object identifiers to track inflight backend copy operations pending for completion; and
utilize the object copy work queue to ensure that all blocks are copied from the source object store into valid objects at the destination object store.

20. The non-transitory machine readable medium of claim 15, wherein the instructions cause the machine to:
modify a read path, implemented to process read operations targeting objects pending to be copied and already copied objects as part of migrating the volume, to extend file system block context checks, wherein the modified read path is implemented for executing the read operations with correct checks to detect data corruption;

in response to receiving a first read operation targeting an object pending to be copied, utilize the read path to redirect the read operation to the source object store; and in response to receiving a second read operation targeting a copied object copied to the destination object store, utilizing a reverse map to verify context information and validate data being read from the copied object, wherein the read path utilizes the context information to avoid a virtual volume block number mismatch error from a source based virtual volume block number stored in a context area of the copied object not matching a virtual volume block number expected at the destination cluster.

* * * * *